United States Patent [19]
Janicki et al.

[11] Patent Number: 6,107,373
[45] Date of Patent: Aug. 22, 2000

[54] CONSUMABLE ASPHALT CONTAINERS AND METHOD OF REDUCING FUMES FROM A KETTLE OF MOLTEN ASPHALT

[75] Inventors: Richard T. Janicki, Oaklawn, Ill.; Donn R. Vermilion, Newark, Ohio; Kevin P. Gallagher, Pataskala, Ohio; Frederick H. Ponn, Newark, Ohio; Michael R. Franzen, Lombard, Ill.; Jorge A. Marzari, Darien, Ill.; Jay W. Keating, Tinley Park, Ill.; David C. Trumbore, La Grange, Ill.; Steven G. Harris, Newark; Edward Mirra, Jr., Toledo, both of Ohio

[73] Assignee: Owens Corning Fiberglas Technology, Inc., Summit, Ill.

[21] Appl. No.: 08/940,550

[22] Filed: Sep. 30, 1997

Related U.S. Application Data

[60] Division of application No. 08/657,831, May 31, 1996, Pat. No. 5,733,616, which is a continuation-in-part of application No. 08/484,758, Jun. 7, 1995, abandoned, and a continuation-in-part of application No. 08/606,320, Feb. 23, 1996, abandoned, which is a continuation-in-part of application No. 08/484,758, Jun. 7, 1995, abandoned, and a continuation-in-part of application No. 08/606,321, Feb. 23, 1996, abandoned, which is a continuation-in-part of application No. 08/484,758, Jun. 7, 1995, abandoned.

[51] Int. Cl.$^7$ ...................................................... C08L 95/00

[52] U.S. Cl. ................................. 524/59; 524/68; 524/69; 524/70; 524/71

[58] Field of Search ................................. 428/35.7, 36.8, 428/489; 206/447, 524.7, 525; 525/222; 524/68, 69, 59, 70, 71

[56] References Cited

U.S. PATENT DOCUMENTS

| | | | |
|---|---|---|---|
| 3,366,233 | 1/1968 | Roediger | 206/524.2 |
| 4,073,760 | 2/1978 | Harris et al. | 206/524.7 |
| 5,307,608 | 5/1994 | Muir et al. | 53/440 |
| 5,452,800 | 9/1995 | Muir | 206/447 |
| 5,733,616 | 3/1998 | Janicki et al. | 428/35.7 |
| 5,765,686 | 6/1998 | Wright et al. | 206/447 |
| 5,789,048 | 8/1998 | Flieger | 428/35.7 |

*Primary Examiner*—Rena L. Dye
*Attorney, Agent, or Firm*—Inger H. Eckert; James J. Dottavio

[57] ABSTRACT

A consumable container is molded from a composition comprising 40 to 90 weight % of an asphalt and 10 to 60 weight % of a polymer material, which advantageously can include a first polymer such as PP that imparts heat resistance and a second polymer such as EVA that imparts toughness and impact resistance. This molded asphalt/polymer material preferably has an unnotched Izod impact strength of at least 2 joules. The container is consumable—it can be melted along with roofing asphalt held in the container without adversely affecting the properties of the asphalt and without requiring undue mixing. The composition also can be used to reduce fumes normally emitted from a kettle of molten asphalt, e.g., as measured by a reduction of the visual opacity of the fumes by at least 25%, a reduction of the hydrocarbon emissions of the fumes by at least 20%, or a reduction of the total suspended particulates emissions of the fumes by at least 15%. The container may be used, e.g., to hold roofing or paving asphalt or a recyclable petroleum-derived material, such as used motor oil. In one embodiment, the container composition may include one or more ingredients to improve the quality of paving-grade asphalt

23 Claims, 9 Drawing Sheets

CONSUMABLE ASPHALT CONTAINERS AND METHOD OF REDUCING FUMES FROM A KETTLE OF MOLTEN ASPHALT

This is a divisional of U.S. patent application Ser. No. 08/657,831, filed May 31, 1996, now U.S. Pat. No. 5,733, 616, which is a continuation-in-part of: Ser. No. 08/484,758 by Janicki et al., filed Jun. 7, 1995, now abandoned; Ser. No. 08/606,320 by Vermilion et al., filed Feb. 23, 1996, now abandoned, which is a continuation-in-part of Ser. No. 08/484,758 now abandoned; and Ser. No. 08/606,321, now abandoned by Harris et al., filed Feb. 23, 1996, now abandoned, which is also a continuation-in-part of Ser. No. 08/484,758 filed Jun. 7, 1995 now abandoned.

FIELD AND INDUSTRIAL APPLICABILITY OF INVENTION

This invention relates in general to asphalt materials for use in making products such as containers. More particularly, this invention relates to moldable asphalt-based materials suitable for making products such as injection-molded containers.

The containers are consumable. For example, in one embodiment of the invention the containers are used for shipping processed asphalt (e.g., air-blown roofing asphalt made with ferric chloride as a catalyst) or raw asphalt (e.g., paving asphalt), where the asphalt is to be remelted by the customer for application in the customer's product or process, and may be melted together with the asphalt and used in the product or process. The meltable containers may advantageously provide for the improvement or enhancement of the material, e.g., paving asphalt, contained therein upon melting for application. In another embodiment, the containers are used for packaging recyclable oil such as motor oil, where the container can be melted for addition to a recycling stream along with used motor oil.

This invention also relates in general to low-fuming asphalt materials for use in roofing and other applications. More particularly, this invention relates to a method of reducing fumes from a kettle of normal molten asphalt where processed or raw asphalt is remelted by the customer for application in the customer's product or process. The invention also relates to reducing the odors normally produced by molten asphalt.

The invention can be useful for providing molten asphalt for applications such as built-up roofing systems in locations where fumes from the kettle are a concern and for similar industrial applications, such as providing molten paving or mopping asphalt. The invention can also be useful for packaging motor oil and like petroleum-derived products.

BACKGROUND OF INVENTION

Various problems are associated with conventional packaging and melting of asphalt. Asphalt from asphalt processing and terminalling facilities is transported to the asphalt customer in several ways, including direct piping of the molten asphalt to nearby customers, shipping in liquid form via tanker truck and railcar, and shipping in solid form in individual packages. The individual packages are used primarily by building contractors as a source of asphalt for roofing applications and in other construction applications. The contractor usually places the solid asphalt in a gas-fired melting kettle, which melts the asphalt for use by the contractor.

A problem associated with these heated kettles of normal molten asphalt is that they can emit significant amounts of fumes. The fumes can be unsightly and an irritant to workers and other people in the surrounding area. Accordingly, it would be desirable to reduce the amount of fumes normally emitted from a kettle of molten asphalt.

It would also be desirable to reduce fuming and odors without substantial modification of the processed or raw asphalt. By contrast with known polymer-modified asphalt compositions, which are highly modified materials where the polymer is used, e.g., to impart elongation properties, an asphalt without such modification is desired for many applications.

It would also be desirable to reduce fuming and odors of melted asphalt while permitting for convenient, user-tailorable enhancement or alteration of the asphalt properties.

Furthermore, it would be desirable to produce a low-fuming asphalt in a convenient package. Individual packages of asphalt are typically formed at conventional asphalt processing facilities by pouring molten asphalt into containers made of a metal bottom and paper cylindrical sidewalls. The asphalt is typically poured at temperatures of about 177° C. and the packages are allowed to cool for up to 24 hours prior to shipping.

A problem with existing asphalt packages is that removal of the paper and metal container from the solid asphalt is time-consuming. The disposal of the paper and metal container material is also burdensome. Therefore, it would be desirable to be able to package asphalt in individual packages and yet eliminate the need to remove the container or to dispose of the container.

In particular, it would be desirable to provide a container for asphalt that is consumable so that it can be melted right along with the asphalt. Preferably, such a container could be formed by a molding process such as injection-molding. Molding processes offer advantages in costs, design flexibility, and features that can be incorporated into the container. A problem with molded containers, however, is that they are susceptible to breakage from impacts or other rough handling by equipment or workers. Therefore, it would be desirable if the containers were tough and impact-resistant in order to withstand such rough handling.

Conventional containers for motor oil also pose problems. Motor oil is pumped from the crankcase through the engine of a vehicle to reduce friction and wear of the moving parts. The motor oil must be changed periodically to maintain its effectiveness in the engine. For example, in some vehicles the recommended interval for changing the motor oil is between 5,000 and 8,000 kilometers. The motor oil is changed by draining the used motor oil from the crankcase and replacing it with new motor oil.

Many vehicle owners choose to save money by changing the motor oil themselves instead of taking the vehicle to a mechanic. Typically, the vehicle owner drains the used motor oil into a disposable container, such as a milk carton. The vehicle owner transports the container of used oil to a collection site for recycling. At the collection site, the oil is poured from the container into a large collection tank. The used container is then returned to the vehicle owner for disposal, or is retained at the collection site for disposal.

Because the used motor oil is viscous, a significant amount of oil remains in the container after pouring. An unfortunate result is that disposal of the used container may cause environmental problems. For example, the used motor oil can seep into the groundwater at a waste disposal site and contaminate the water supply. In addition to possible environmental problems, disposal of the used container is burdensome and can be messy. Another problem is that pouring the used motor oil from the container into the collection tank at a collection site is inconvenient and time-consuming.

Therefore, it would be desirable to be able to recycle used motor oil without the need for disposal of a used container. It would also be desirable to be able to recycle used motor oil without the need to pour the oil from the container into a collection tank.

SUMMARY OF INVENTION

The invention helps solve the above-mentioned problems and overcomes drawbacks of conventional packaging for asphalt or motor oil. The invention generally relates to a consumable containers useful for packaging asphalt, motor oil, and the like.

The invention relates to a moldable asphalt material suitable for making products such as injection-molded containers. This invention also relates to an asphalt package comprising the consumable container filled with asphalt, and to a motor oil package comprising the consumable container filled with motor oil. In general, the consumable container or moldable asphalt material comprises, by weight, from about 40% to about 90% of an asphalt and from about 10% to about 60% of a polymer material. In one aspect of the invention, the material or composition for forming a consumable asphalt container is strong and impact-resistant. The moldable asphalt material preferably has an unnotched Izod impact strength or toughness of at least about 2 joules, more preferably of at least about 3 joules, so that the container made from the material is tough and impact-resistant to withstand rough handling.

In one embodiment, a container made from the material is consumable so that it can be melted along with raw or processed asphalt held in the container without adversely affecting the properties of the asphalt, and without requiring undue mixing. Preferably, the container, when melted in raw or processed asphalt, reduces the amount of fumes normally emitted from such asphalt.

In another embodiment, a container made from the material is consumable so that it can be melted along with raw or processed asphalt therein, and has a composition that advantageously alters or enhances the properties of the asphalt. The composition can be readily varied from user to user, providing a convenient way to tailor the properties of the asphalt for the specific application. Thus, a standard asphalt can be used for a wide variety of applications, with the tailorable consumable container compositions serving as a means for altering the properties of the asphalt as desired.

In yet another embodiment, the consumable container can be melted for addition to a recycling stream along with used motor oil contained therein. Consequently, there is no need to pour the oil from the container into a collection tank and then dispose of the used container. The vehicle owner drains the used motor oil from the vehicle into the container and seals the container. Then the vehicle owner can simply ship or drop off the container containing the oil to be recycled. The container and its used oil contents can then be added into an oil recycling stream, or into an air-blowing converter to be reprocessed into air-blown asphalt. Thus, the container provides a clean, user-friendly, environment-friendly method for the disposal of used motor oil.

In general the polymer material of the moldable asphalt composition can be any polymer or mixture of polymers that is compatible with the asphalt and enables the container to have the desired physical properties. Certain types of polymers help provide the container with high toughness and impact resistance, while others help impart high-temperature stability.

Exemplary polymers that may be used as a component of the polymer material include polymers selected from ethylene, propylene, ethylene-propylene copolymers, and butylene copolymers. In addition, copolymers of acrylates and methacrylates, such as butyl, propyl, ethyl, or methyl acrylate or methacrylate copolymerized with ethylene, propylene, or butylene, can be used. Also, epoxy-functionalized copolymers are useful to improve the impact-resistance and flexibility of the container, for example, a terpolymer of ethylene, butyl acrylate and glycidyl methacrylate, such as Elvaloy® available from E. I. duPont de Nemours & Co. (Wilmington, Del.). A natural or synthetic rubber can also be used, such as styrene-butadiene-styrene (SBS), styrene-butadiene rubber (SBR), styrene-ethylene-butylene-styrene (SEBS), or terpolymer made from ethylene-propylene diene monomer (EPDM).

Preferably the polymer material includes an ethylene-vinyl acetate copolymer with a vinyl acetate content from about 9% to about 40% by weight, so that it is sufficiently soluble in asphalt. Ethylene-vinyl acetate copolymers with a softening point of at least about 150° C. can improve the melt resistance of the container during pouring of the asphalt. Preferred ethylene-vinyl acetate copolymers are the "Elvax" series from duPont, such as Elvax 360 through 750, preferably Elvax 450 or 470. Ethylene-vinyl acetate copolymers are also available from USI Chemicals under the trade names "Ultrathene" and "Vynathene".

In a preferred embodiment, the consumable container composition or material comprises, by weight, from about 5% to about 50% of a polymer for enhancing impact resistance or toughness, more preferably from about 5% to about 25% of this polymer. More preferably the material comprises, by weight, from about 5% to about 15% ethylene-vinyl acetate (EVA) copolymer, and even more preferably from about 8% to about 12% EVA.

A preferred additional polymer component of the polymer material is one that enhances high-temperature stability, such as polypropylene (PP) having a melting point of 163° C. and a crystallinity of 40%. The moldable asphalt composition comprises, by weight, from about 5% to about 55% of this polymer, more preferably from about 20% to about 40%. Although this polymer by itself is typically not sufficient to provide the moldable asphalt material with the desired toughness and impact resistance, when another polymer such as ethylene-vinyl acetate copolymer is also mixed with the asphalt, the resulting moldable asphalt material has the desired toughness and impact resistance.

When the polymer material includes only one polymer such as polypropylene, the moldable asphalt composition will typically have an unnotched Izod impact strength less than 2.7 joules. In a preferred embodiment, asphalt is combined with EVA and PP polymers so that the composition has an unnotched Izod impact strength of at least 2.7 joules, and preferably at least about 4 joules.

In another aspect, the invention relates to a method of reducing fumes normally produced from a kettle of molten asphalt. More specifically, asphalt is placed into a kettle and heated to melt the asphalt. Preferably, the kettle is heated to a temperature of at least about 232° C. The molten raw or processed asphalt (without the polymer) normally emits fumes from the kettle. In accordance with the invention, about 0.25 to about 6 percent by weight of a polymer material is added to the asphalt to reduce the fumes from the kettle. Preferably the added polymer material reduces the fumes by forming a skim, skin, or film across substantially the entire upper surface of the molten asphalt. The skim eventually dissolves in the bulk asphalt but is continually renewed as material is cycled through the kettle. The reduction of fumes from the kettle may be measured by a reduction of the visual opacity of the fumes by at least about 25%, a reduction of the hydrocarbon emissions of the fumes by at least about 20% and/or a reduction of the total suspended particulates emissions of the fumes by at least about 15%. Preferably, the reduction satisfies all three measurement requirements. It should be understood that the invention is able to achieve fume reductions well above the preferred minimum reductions in the measurements given above, as well as a reduction in odor. Preferably, the invention reduces each of the normal opacity, emissions, and particulates measurements by at least about 35%, more preferably at least about 50%, and even more preferably at least about 75%, at a kettle temperature of about 450–550° F. (232–288° C.).

A polymer material, such as one of the above-listed copolymers may be added, e.g., by hand, to a kettle of molten asphalt and mixed into the asphalt to form a skim that reduces fuming from the kettle. Preferably, at least one polymer selected from polypropylene, SBS rubber, SEBS rubber, and ethylene-vinyl acetate copolymer is added. The polymer material may be added at a level of from about 0.25 to about 6%, more preferably at a level of from about 0.5 to 3%, e.g., at a level of about 1.3%, by weight of the total asphalt and polymer material in the kettle (e.g., the asphalt in the asphalt/polymer composition of the container combined with the raw or processed asphalt contained therein). Preferably both the asphalt without the polymer, and the asphalt with the added polymer, meet the requirements for roofing asphalt according to ASTM D312.

In a preferred embodiment of the invention, the polymer is added in the form of a consumable container for the asphalt molded from a composition comprising, by weight, from about 40% to about 90% asphalt and from about 10% to about 60% polymer. The consumable container avoids problems associated with removing and disposing of a conventional paper and metal container.

Alternatively, the polymer can be added to the raw or processed asphalt before packaging in a conventional paper and metal container. Moreover, the polymer may also be added to the kettle of molten asphalt in the form of a pelletized blend of asphalt and polymer, preferably a blend of about 60% asphalt and about 40% polymer by weight. A thin polymer film may also be suitably formed of one or more of the polymers, the film preferably having a thickness from about 0.025 mm to about 0.25 mm. The film may be placed onto the upper surface of the molten asphalt in the kettle to reduce fuming.

DETAILED DESCRIPTION AND PREFERRED EMBODIMENTS OF INVENTION

Figure 1:
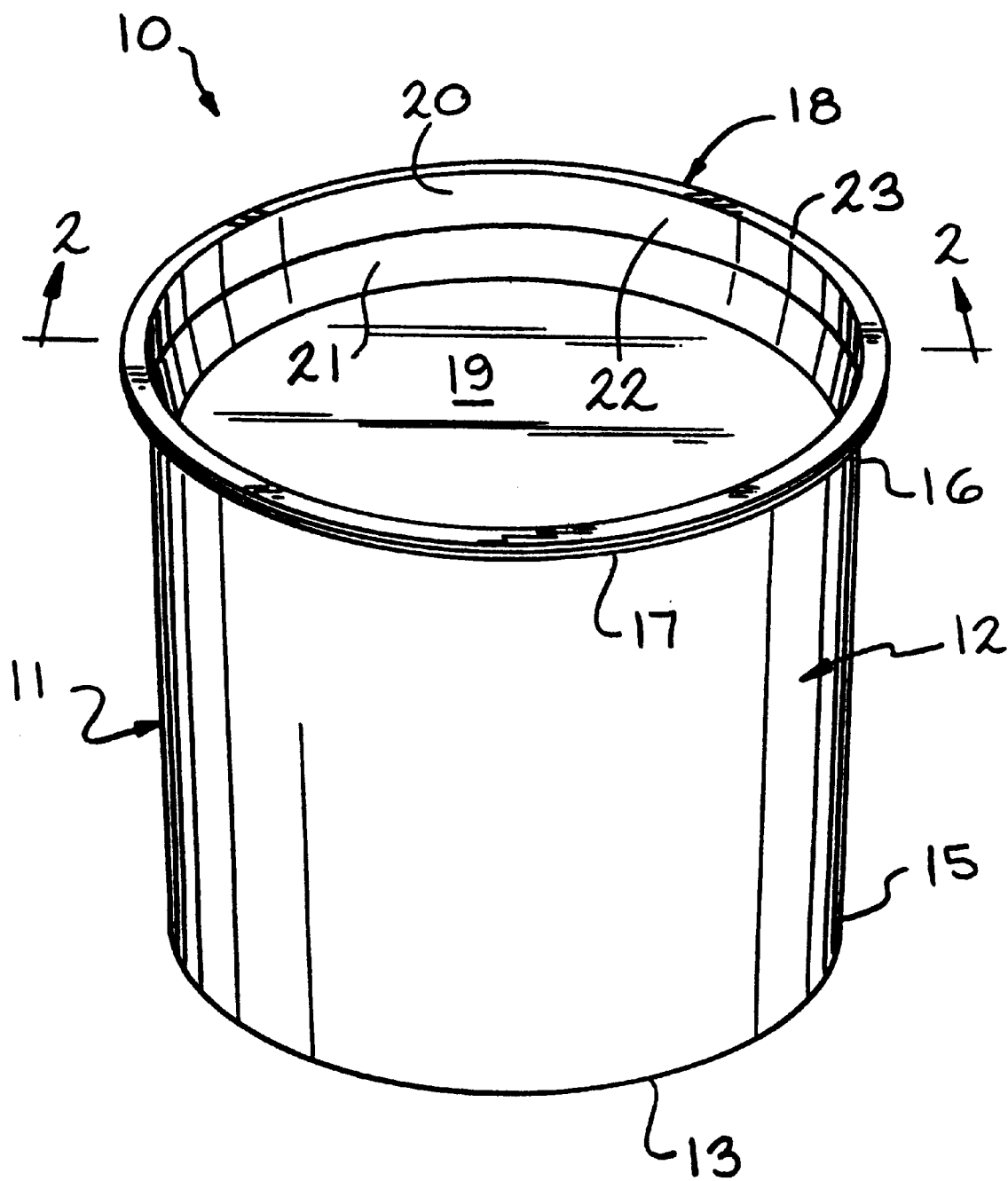
FIG. 1 is a schematic view in perspective of one embodiment of an asphalt package, which includes a consumable container filled with asphalt, useful for reducing fumes and odors from a kettle of the molten asphalt in accordance with this invention.

An asphalt package in accordance with the invention comprises a consumable asphalt container holding raw or processed asphalt to be melted and used in an application such as roofing or paving. For a container of roofing asphalt, the weight of the container is preferably kept low as a percentage of the total weight of the asphalt package. A low container weight provides desired softening point, viscosity, penetration, and solubility properties, and keeps the cost low. Preferably the asphalt package comprises, by weight, from about 2% to about 6% container and from about 94% to about 98% raw or processed asphalt, and more preferably from about 2.5% to about 3.5% container and from about 96.5% to about 97.5% asphalt.

In a preferred embodiment, the asphalt package comprising the container filled with raw or processed asphalt has a solubility in trichloroethylene of at least 99% so that it meets ASTM standards for asphalt used in roofing. The polymer material incorporated to improve toughness and impact resistance can also provide improved solubility of the asphalt package in trichloroethylene.

As discussed above, when asphalt is used in roofing applications, it is usually melted in a gas-fired kettle for use by the roofing contractor. A problem associated with these heated kettles containing conventional molten asphalt is that they can emit significant amounts of fumes. These fumes can be unsightly and an irritant to workers and other people in the surrounding area. Advantageously, it has been found that the polymer/asphalt material of this invention helps to control fuming from the kettle.

In an alternative embodiment, a consumable container according to the invention can be used to package paving asphalt and to reduce fuming of this asphalt when melted. For such a container, the amount of polymer material used in the container composition is preferably sufficient to provide a total of from about 1 to about 5% by weight based on the total weight of the package (container plus the asphalt contained therein).

Accordingly, this invention also relates to a consumable container composition comprising, by weight, from about 40% to about 90% asphalt and from about 10% to about 60% polymer material, in which the material when melted in a kettle or heating vessel causes at least about 25% visual reduction of fumes from the kettle compared to the asphalt alone (without any polymer) when melted in the kettle. The visual reduction of fumes may be measured as a reduction in opacity.

Another advantage of this invention is that the container composition has a higher tolerance for polymer materials that vary from specifications. For example, the polymer can be off-spec relative to molecular weight, melt index, or color. The polymer can also be a between-run material where some amounts of the previously processed polymer are still present. In accordance with the invention, a small amount of at least one suitable polymer is added to an asphalt so that the amount of fumes normally emitted from a kettle of the molten asphalt is significantly reduced, but without significant modification of the asphalt. The fuming reduction is particularly dramatic at high kettle temperatures, where fuming is at its worst using conventional asphalt products.

Accordingly, this invention relates to a method of reducing fumes emitted from a kettle of molten asphalt. The term "kettle" means any container or vessel suitable for holding molten asphalt, such as a roofer's kettle. It is understood that the asphalt is not low-fuming per se, but rather that the fumes emitted from a kettle of the molten asphalt are controlled and thereby reduced.

The asphalt is heated to a temperature sufficient to melt the asphalt. This normally produces fumes from the kettle. The added polymer melts along with the asphalt, and some of it collects on the upper surface of the molten asphalt prior to dissolution to form a skim. The term "skim" means a thin layer or film which floats or forms on the upper surface of the molten asphalt. Preferably the polymer forms a skim across at least about 80–90% of the upper surface area of the molten asphalt, and more preferably across substantially the entire upper surface of the molten asphalt. It is understood that when additional asphalt is placed into the kettle, the skim may be broken but it usually quickly re-forms over the surface.

While not intending to be limited by theory, it is believed that the skim reduces fuming from the kettle by acting as a cool top or barrier to exposure of the molten asphalt to air. The thickness of the skim is a function of the addition rate of polymer material minus the dissolution rate. The dissolution rate is a function of fundamental polymer properties as well as kettle temperature and agitation level. The thickness of the skim is usually from about 3 mm to about 13 mm, typically about 6 mm. It is believed that a skim thickness of at least about 0.025 mm, more preferably of at least about 0.25 mm, however, is suitable for reducing fuming from the kettle.

The skim is viscous enough so that it stays together as a continuous layer to reduce fuming from the kettle. If the viscosity of the skim is too low, fumes from the molten asphalt could break up through holes in the skim and escape from the kettle. To provide sufficient viscosity, preferably the added polymer has a melt flow index from about 15 to about 95 grams/10 minutes, more preferably from about 25 to about 85 grams/10 minutes, and even more preferably from about 35 to about 75 grams/10 minutes. A lower melt flow index generally indicates a more viscous polymer. If the melt flow index is too low, it is difficult to disperse the polymer in the asphalt without agitation. The melt flow index is measured at 190° C. under a 2.16 kg load according to ASTM D1238 Method B. Of course, this parameter, like the other parameters mentioned herein, may be measured by any other suitable test. When the polymer is added in the form of a consumable container for the asphalt, as will be described below, it is preferred but not critical that the container has a melt flow index within the above ranges.

The added polymer material will dissolve in the molten asphalt over a period of time, so that more polymer must be added to the kettle in order to maintain the skim. It is important that the skim be maintained throughout the roofing operation in order to continue providing its function of reducing fumes from the kettle. Preferably each addition of polymer to the molten asphalt is sufficient to maintain the skim for at least about 30 minutes, more preferably at least about 1 hour, and even more preferably at least about 2 hours. In preferred embodiments, the polymer is added at intervals during the day so that the skim stays about the same thickness.

The polymer material can be added to the asphalt in any manner sufficient to reduce filing from the kettle. For example, the polymer can be added to the kettle after the asphalt has been melted in the kettle. Any means can be used to mix the polymer into the asphalt. The polymer can also be added to a kettle of molten asphalt in the form of a blend of asphalt and polymer, such as a pelletized blend. When the blend is added to a kettle of molten asphalt, the blend will melt and form a skim on the upper surface. As another example, a thin polymer sheet can be placed onto the upper surface of molten asphalt in the kettle to reduce fuming. Such a sheet may have a thickness from about 0.025 mm to about 0.25 mm. The polymer can also be added to the asphalt before placing the asphalt into the container for melting. As will be described below, the polymer is preferably added to the asphalt in the form of a consumable container for the asphalt. When the container is placed into a kettle of molten asphalt, the container melts and the polymer rises to the top of the asphalt and forms a skim to reduce fuming.

The polymer material is added to the asphalt in an amount sufficient to reduce the visual opacity of the fumes by at least about 25% with respect to the same asphalt without the polymer. The visual opacity of the fumes is a measure of the blockage of natural light by the fumes. The more fumes emitted from the kettle, the higher the visual opacity. Conversely, a reduction in the visual opacity indicates a reduction in the amount of fumes emitted from the kettle. Preferably the polymer is added in an amount sufficient to reduce the visual opacity of the fumes by at least about 35%, more preferably at least about 50–60%, and even more preferably at least about 70–80%.

The reduction in visual opacity of the fumes increases at higher temperatures where fuming is at its worst with conventional asphalt products. The kettles of roofing asphalt may be heated at temperatures of from about 232° C. to about 288° C., e.g., at a temperature of about 260° C. Preferably the added polymer reduces the visual opacity of the fumes by at least about 35% at 260° C., and more preferably at least about 50% at 260° C.

Similarly, the hydrocarbon emissions of the fumes are reduced by at least about 20% over the same asphalt without the polymer. Preferably the hydrocarbon emissions are reduced by at least about 30%, more preferably at least about 45–55%, and even more preferably at least about 65–75%. The hydrocarbon emissions are the volatile organic compounds present in the fumes, so that a reduction in hydrocarbon emissions indicates a reduction in the amount of fumes emitted from the kettle. Preferably the hydrocarbon emissions are reduced by at least about 30% at 260° C., and more preferably at least about 50% at 260° C.

The total emissions of suspended particulates is reduced by at least about 15% over the same asphalt without the polymer. Preferably the total is reduced by at least about 25%, more preferably at least about 40–50%, and even more preferably at least about 60–70%. The total suspended particulates emissions is made up of the small particles of solid materials present in the fumes, so that a reduction in particulates emissions indicates a reduction in the amount of fumes emitted. Preferably the total suspended particulates emissions is reduced by at least about 25% at 260° C., and more preferably at least about 50% at 260° C.

The terms "asphalt" and "raw or processed asphalt" are meant to include asphalt bottoms from petroleum refineries, as well as naturally occurring bituminous materials such as asphalts, gilsonite, tars, and pitches, or these same materials that have been air-blown or otherwise chemically processed or treated. For example, the asphalt can be air blown with catalysts such as ferric chloride and the like. The asphalt can be a conventional roofing flux asphalt or a paving-grade asphalt, as well as other types of asphalts, including specialty asphalts such as water-proofing asphalts, battery compounds, and sealers. Blends of different kinds of asphalt can also be used.

A preferred asphalt has a ring and ball softening point higher than about 90° C. The ring and ball softening point is typically measured according to ASTM D36. When the molten asphalt is used as a roofing asphalt, a preferred asphalt is an air-blown roofing flux. When the polymer is added in the form of a consumable container for the asphalt, one type of preferred asphalt for making the container is an air-blown paving-grade asphalt in the range of from AC-2 to AC-50, more preferably AC-10 or AC-20. The optimum percentage of asphalt in the container composition will depend on the type of asphalt to be held in the container as well as the properties of the polymer and asphalt in the container composition. The source of asphalt may have a significant effect on the composition of the container.

The polymer material added to the asphalt can be any polymer capable of melting and forming a skim on the upper surface of the molten asphalt to reduce fuming from the kettle. The polymer should have a relative density lower than that of the asphalt so that it rises to the upper surface of a kettle of the molten asphalt The polymer should be miscible and compatible with the asphalt. The polymer, however, should not significantly modify the asphalt in the amount added.

Preferably, the polymer material is selected from polypropylenes, ethylene-vinyl acetate copolymers, natural or synthetic rubbers such as SBS, SBR, SEBS or EPDM, and mixtures thereof. The ethylene-vinyl acetate copolymer preferably has a vinyl acetate content from about 5% to about 40% by weight, preferably from about 9% to about 28% by weight, so that it is suitably soluble in the asphalt. Other appropriate polymers, and mixtures of such polymers, can also be used. For instance, additional polymers, such as polyethylenes, may be suitable for containers of paving asphalt, since pouring temperatures of paving asphalt, which may be about 110–132° C. (230–270° F.), are typically lower than pouring temperatures of roofing asphalt. Although a typical polyethylene polymer may be undesirable for a roofing-asphalt container because it balls up and forms hard lumps of polymer on the upper surface of molten asphalt, it might be possible to chemically modify the polyethylene or select a particular grade of polyethylene to make it generally suitable for the invention.

Preferably from about 0.25% to about 6% polymer is added by weight of the total asphalt and polymer. For a container for roofing asphalt, more preferably from about 0.5% to about 3%, and even more preferably from about 1% to about 2.5%, polymer is added based on the total weight of asphalt and polymer. For a container for paving-grade asphalt, more preferably from about 1 to about 5% polymer is added based on the total weight of asphalt and polymer.

When the polymer material is added in the form of a consumable container for the asphalt, preferably the polymer is a mixture of from about 50% to about 95% of a first polymer and from about 5% to about 50% of a second polymer, by weight. The first polymer has a melting point of at least about 150° C. to provide high-temperature stability to the container. Exemplary first polymers include thermoplastic polymers that provide high-temperature resistance, such as styrene-acrylonitrile, polybutylene terephthalate, polyurethane, and thermoplastic polyolefins. A preferred first polymer is polypropylene having a melting point of 163° C. and a crystallinity of 40%.

The second polymer is added to provide the container with toughness and impact resistance. Preferably, the second polymer is ethylene-vinyl acetate copolymer having a vinyl acetate content of from about 9% to about 40% by weight. Preferred ethylene-vinyl acetate copolymers are the "Elvax" series from duPont, such as Elvax 265 through 750, and more preferably Elvax 450 or 470. Natural or synthetic rubbers are also useful for the second polymer.

One or more filler materials, such as crushed stone, glass fibers, talc, calcium carbonate, or silica, can be added to the asphalt. Such filler materials would be undesirable in some end uses of packaged asphalt, however. It is to be understood that the filler materials are to be ignored when calculating the percentages of other specified materials in the asphalt; thus, the weight percentages of ingredients given herein are based on total weights of the materials or compositions exclusive of any filler or the like present in the material or composition.

Optionally, non-polymeric chemical modifiers, such as phosphoric acid, may be added to the container composition. This feature advantageously permits the use of one or a few standard asphalts to fill the containers, with the desired chemical additives for optimizing the asphalt for the intended application being added to the asphalt via the container. Thus, consumable asphalt packages may be efficiently produced according to the specifications of each customer.

Molten asphalt may be used as paving asphalt preferably one that is readily cold-flowable, in accordance with the invention. The asphalt package for this embodiment should be sufficiently tough to withstand shipping and handling. A consumable container for paving-grade asphalt is preferably thickwalled (e.g., having walls with a thickness of about 0.28 inches), and may be formed by a process such as rotoforming, thermoforming, or injection molding. In a preferred embodiment of a paving-asphalt package, the consumable container is in the form of a 55-gallon (208-liter) drum with a lid. More preferably, a paving-asphalt package weighs about 440 lbs. (200 kg), and includes a 40% polymer material/60% asphalt container that is generally cylindrical and weighs about 33 lbs. (15 kg), with the balance being attributable to the asphalt therein, which is preferably an air-blown asphalt and/or gilsonite. The polymer material and/or another ingredient may advantageously enhance the properties of the asphalt for paving purposes, such as high-temperature performance as measured by, e.g., the Federal Highway Association's pending Strategic Highway Research Program (SHRP) specification, when the package is melted. Exemplary polymers for improving asphalt paving properties are EVA, SBS, polypropylene, and polyethylene. The composition of the container may optionally include one or more fillers, such as organic or inorganic fibers.

Alternatively, molten asphalt made in accordance with the invention may be used as a roofing asphalt. Preferably, the asphalt without (before addition of) the polymer meets the requirements for at least one type of roofing asphalt according to ASTM D312, more particularly ASTM D312-89. It is preferred that the addition of the polymer to the asphalt reduces fuming but does not significantly change the properties of the asphalt. Consequently, the asphalt with the added polymer preferably also meets the requirements for at least one type of roofing asphalt according to ASTM D312. More preferably, the asphalt with the added polymer meets the following ASTM D312 specifications for a Type III roofing asphalt: softening point (by ASTM D36) of 85–96° C.; flash point of 246° C. minimum; penetration (by ASTM D5) at 0° C. of 6 dmm minimum, at 25° C. of 15–35 dmm, and at 46° C. of 90 dmm maximum; ductility (by ASTM D-113) at 25° C. of 2.5 cm minimum; and solubility (by ASTM D2042) in trichloroethylene of at least 99%. Preferably the addition of the polymer to the asphalt does not change the softening point of the asphalt by more than about 9° C., more preferably not more than about 3° C., and does not change the penetration of the asphalt by more than about 10 dmm at 25° C. A preferred roofing-asphalt package weighs about 60 lbs. (27.2 kg) and includes a generally cylindrical container holding Type III ASTM D312-89 asphalt.

In a preferred embodiment of the invention, polymer is added to asphalt and the mixture is formed into a consumable container for the asphalt. The container comprises, by weight, from about 40% to about 90% asphalt and from about 10% to about 60% polymer. The container is consumable so that it can be melted along with asphalt held in the container without requiring undue mixing. For a roofing-asphalt package, the container preferably does not significantly change the properties of the asphalt (as described above for addition of the polymer to the asphalt). Thus, the consumable container overcomes problems associated with conventional paper and metal containers. Further, the added polymer reinforces the container as well as reduces fuming from the kettle. Consumable containers of asphalt can be added to a roofer's kettle throughout the day as needed to supply more asphalt for roofing, for example at intervals of 30 minutes to one hour.

Figure 2:
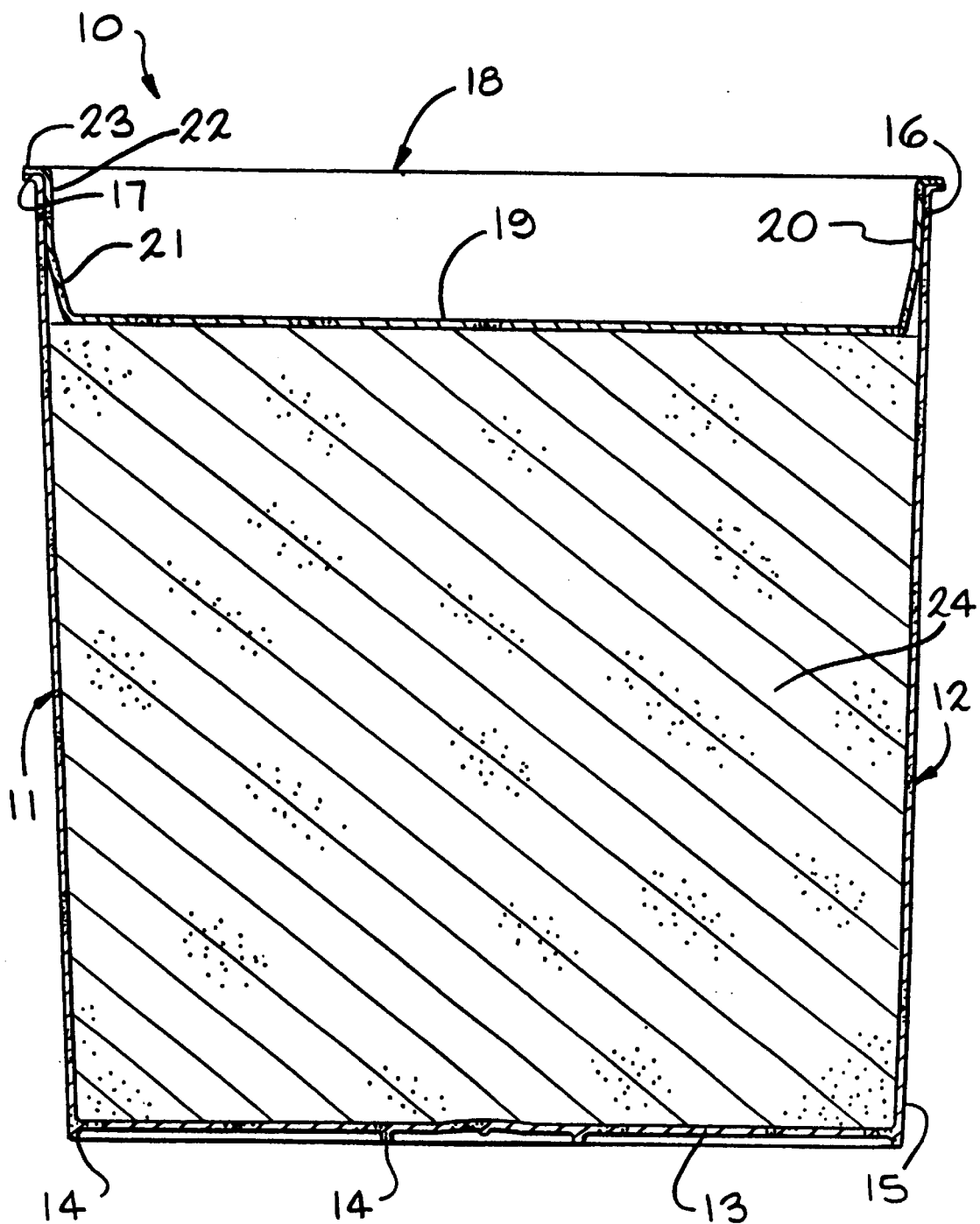
FIG. 2 is a cross-sectional view of the consumable container taken along line 2—2 of FIG. 1.

Referring now to a preferred embodiment of a consumable container for asphalt shown in the drawings, there is illustrated in FIGS. 1 and 2 a consumable container 10. In the illustrated embodiment, the container is generally cylindrical in shape, having an open end and a closed end. However, the container may be any other convenient shape, such as a rectangular solid shape. Although rectangular solid shapes may provide efficiencies in shipping and storing, these advantages may be outweighed by the advantage of providing containers separable by a substantial distance during the pouring process in order to facilitate rapid cooling.

The illustrated embodiment of a consumable container 10 includes a receptacle 11 for holding asphalt. The receptacle has a cylindrical sidewall 12 and a circular base 13 defining a closed end. A pair of concentric, annular protrusions 14 extend downward from the base a short distance. The protrusions can increase the dimensional stability of the container. The sidewall includes a lower end 15 adjacent to the base and an upper end 16 a distance from the base. As shown in FIG. 1, preferably the diameter of the upper end of the sidewall is larger than the diameter of the lower end. This structure provides the ability to easily stack one container on top of another container, as will be described below. In a preferred embodiment, the diameter of the sidewall is about 35.6 cm at the upper end and about 31.8 cm at the lower end. Preferably the container is molded with a tapered sidewall having a lower sidewall which is thicker than the upper sidewall, to increase the strength of the container. In the illustrated embodiment, the sidewall has a thickness of about 0.20 cm at the lower end and about 0.17 cm at the upper end. The receptacle is about 38.1 cm high. An annular flange 17 extends outward from the upper end of the sidewall a short distance, preferably about 0.64 cm.

The container 10 further includes a lid 18, which is generally circular in shape. The lid includes a circular cover 19 and a generally cylindrical skirt 20 extending upward from the perimeter of the cover. The skirt includes a lower portion 21 which angles outwardly from the cover, and an upper portion 22 which angles very slightly outwardly from the lower portion. The outer diameter of the upper portion of the skirt is substantially the same as the inner diameter of the upper end of the receptacle, so that the lid can be received and tightly secured within the upper end of the receptacle. The lid also includes an annular flange 23 which extends outwardly from the skirt portion a short distance. The receptacle is filled with asphalt 24, such as roofing asphalt. Then the lid is positioned on the receptacle to close the container, with the flange of the lid engaging the flange of the receptacle.

Figure 3:
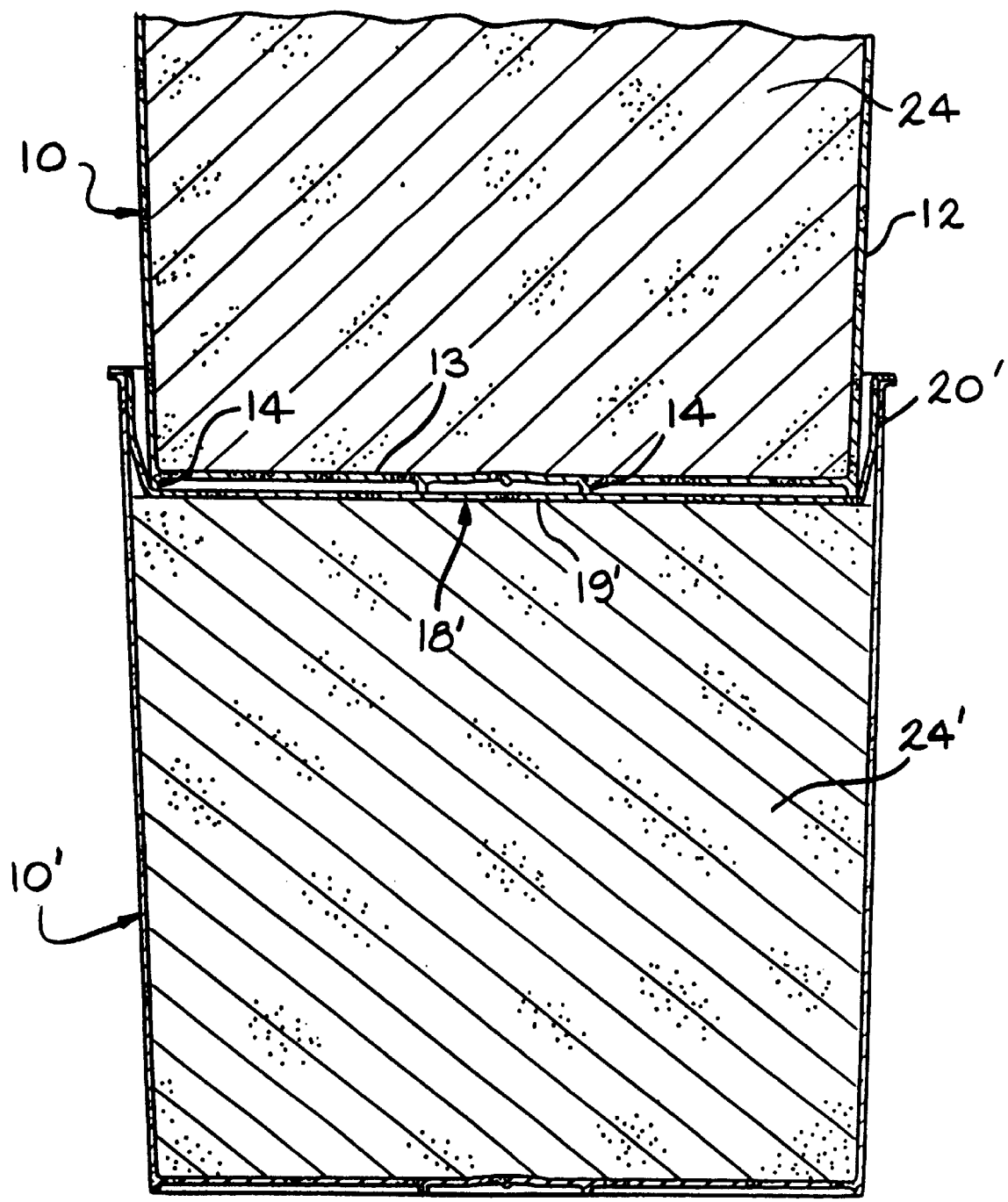
FIG. 3 is a cross-sectional view of a pair of consumable containers of asphalt, with one of the containers stacked on top of the other.

Referring to FIG. 3, it can be seen that the preferred container has a structure that enables a first container 10 to be stacked on top of a second container 10' to reduce shipping and storage costs. The base 13 of the first container is positioned inside the lid 18' of the second container. The sidewall 12 of the first container fits inside the skirt 20' of the lid of the second container. Preferably, concentric annular protrusions 14 of the first container rest on the circular cover 19' of the second container, which is shown filled with asphalt 24' to form an asphalt package.

The container has a composition, by weight, of from about 40% to about 90% asphalt and from about 10% to about 60% polymer, more preferably from about 55% to about 75% asphalt and from about 25% to about 45% polymer. It is preferred to use a high proportion of asphalt in the composition of the container for roofing asphalt because of the lower cost of asphalt relative to the cost of the polymer. Also, a higher percentage of asphalt gives rise to a greater compatibility with the asphalt in the container.

The container should have a sufficiently high softening point to withstand the high temperatures associated with molten asphalt, and with shipping and storage, without softening. Preferably the composition of the container has a ring and ball softening point higher than about 107° C., more preferably higher than about 125° C., and even more preferably higher than about 149° C. The ring and ball softening point may be measured by ASTM D36.

The container can be formed by any convenient process. For example, the sidewall of the receptacle can be bonded to the base. However, preferably the container is formed as an integral or unitary structure by a molding process such as injection molding, blow molding, or rotation molding.

An injection-molding process is particularly preferred. As known to persons skilled in the art, an injection-molding process usually involves the use of a screw and heated barrel assembly to heat-soften the composition to be molded. The heat-softened composition is then injected into a closed mold, usually by the action of the screw moving forward. The composition cools and solidifies, taking the shape of the mold cavity.

Molding processes offer advantages in costs, design flexibility, and features that can be incorporated into the container. The molding process enables a variety of features to be easily incorporated in the container as desired. For example, the molding process can be used to mold an embossment on the receptacle or lid for such purposes as labeling, instructions, or marketing logos. Preferably the lid of the container is labeled with the type of asphalt held by the container.

The container can also be adapted with handholds, which can be molded into the container to facilitate handling. Furthermore, ribs can be molded in the container to increase its strength during the pouring phase of the packaging. In a preferred embodiment, one or more circumferential ribs are provided on the outer surface of the receptacle wall, which will remain cooler than the wall during pouring and thereby provide dimensional stability to the container. Also, the container can have one or more recesses which quicken the remelting process by enabling hot asphalt in the kettle to penetrate to interior portions of the asphalt package. The recesses also speed-up the cooling process after the molten asphalt is poured into the container.

A problem with molded containers is that they are susceptible to breakage from impacts or other rough handling by equipment or workers. Accordingly, preferably the container is made from a composition which is formulated to provide toughness and impact resistance to withstand rough handling. The impact resistance or toughness may be defined by unnotched Izod impact strength, which is measured according to ASTM Method D4812. The composition of the container preferably has an unnotched Izod impact strength of at least about 2 joules, more preferably of at least about 2.7 joules, even more preferably of at least about 3 joules, and most preferably of at least about 4 joules.

The container should have sufficient tensile strength and tensile modulus to support the molten asphalt without tearing or significantly yielding. Tensile strength is the maximum stress a material subjected to a stretching load can withstand without tearing or yielding. Tensile modulus is a measure of a material's resistance to tensile stress. Preferably the composition of the container has a tensile strength of at least about 60 kg/cm$^2$ at 22° C. and at least about 14 kg/cm$^2$ at 93° C., and a tensile modulus of at least about 210 kg/cm$^2$ at 93° C. The tensile strength and tensile modulus are both measured according to ASTM Method D638.

Figure 5:
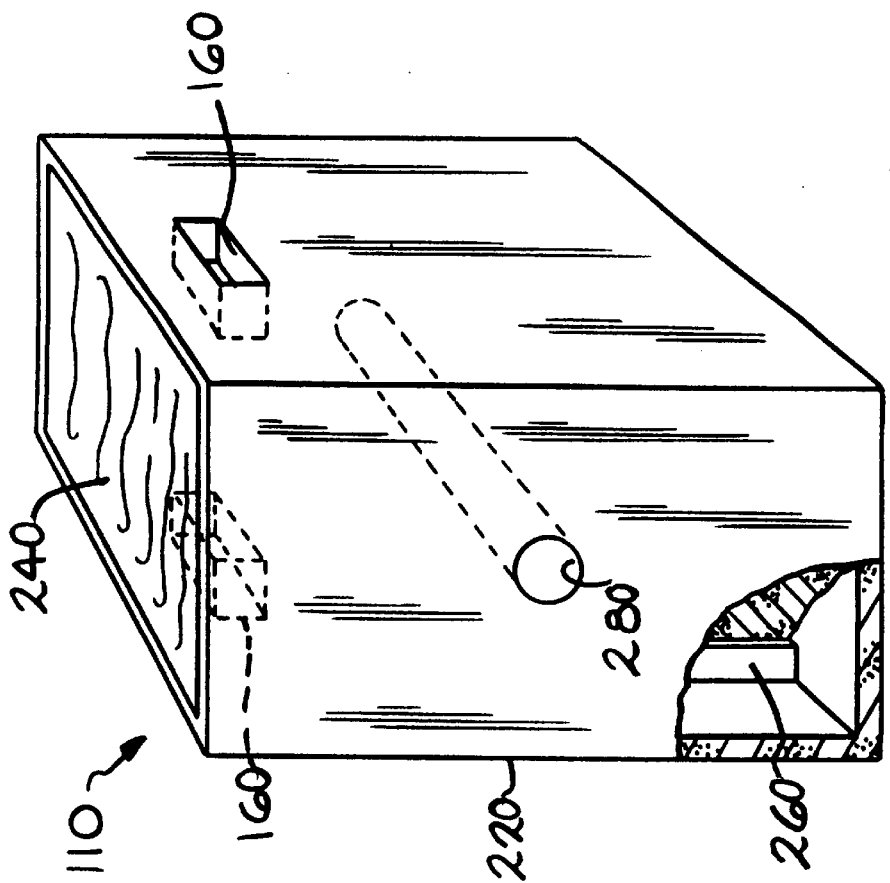
FIG. 5 is a schematic view of an embodiment of an asphalt package of the invention.
Figure 4:
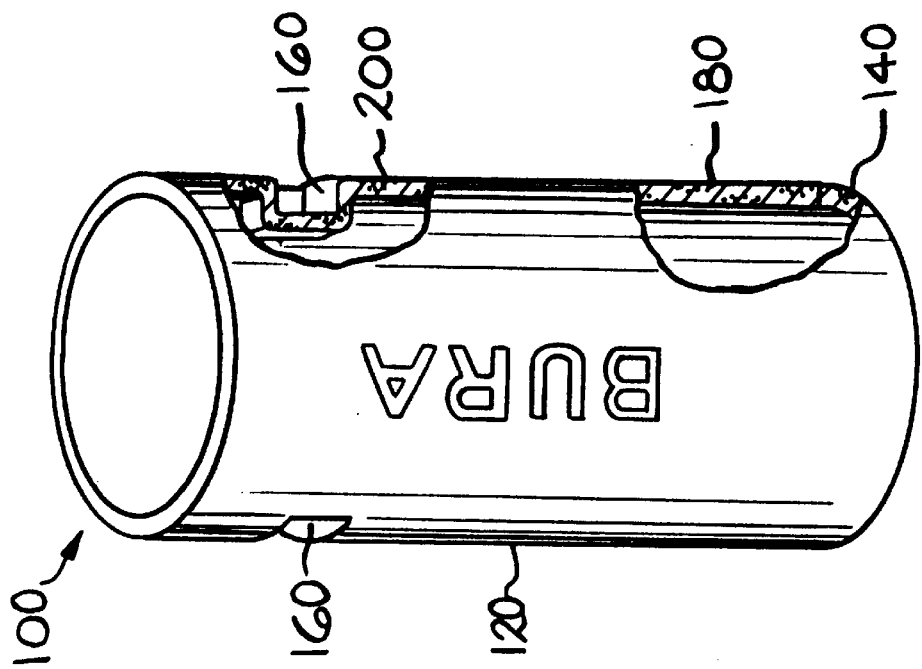
FIG. 4 is a schematic view in perspective of another embodiment of a container for an asphalt package of the invention.

An alternative embodiment of a container and asphalt package is shown in FIGS. 4 and 5. The container 100 is formed in a suitable manner, e.g., by a molding process such as injection, blow, or rotation molding. The container may also be formed by bonding sidewall 120 to a base or bottom 140.

The container 100 may be adapted with handholds 160, which can be molded into the container to facilitate handling. To increase the strength of the container to withstand the stress of being filled with molten asphalt during filling (typical asphalt packages weigh about 50 lbs.), the container can be made with a tapered sidewall 120, having a lower sidewall portion 180 that is thicker than an upper sidewall portion 200.

The asphalt package 110 shown in FIG. 5 comprises container 220 and a body of asphalt 240 inside the container. The asphalt in the container may be selected from grades of build-up roofing asphalt and other types of asphalt, including asphalt cements and specialty asphalts such as waterproofing asphalts, battery compounds, and sealers. The asphalt container need not be cylindrically shaped, and may be any other convenient shape, such as a rectangular solid as shown in FIG. 5.

The asphalt container may be molded with ribs 260 to provide strength to the container during the critical pouring or filling phase of packaging. As an alternative or in addition to internal strengthening ribs, external strengthening ribs may be provided to help avoid bulging during pouring or filling. Also, the container can have one or more recesses 280, which quicken the remelting process by enabling hot asphalt in a kettle to penetrate interior portions of the asphalt package. The recesses also speed up cooling after the molten asphalt is poured into containers. The recesses can be of any size or shape suitable for increasing heat transfer to or from the asphalt package.

Figure 6:
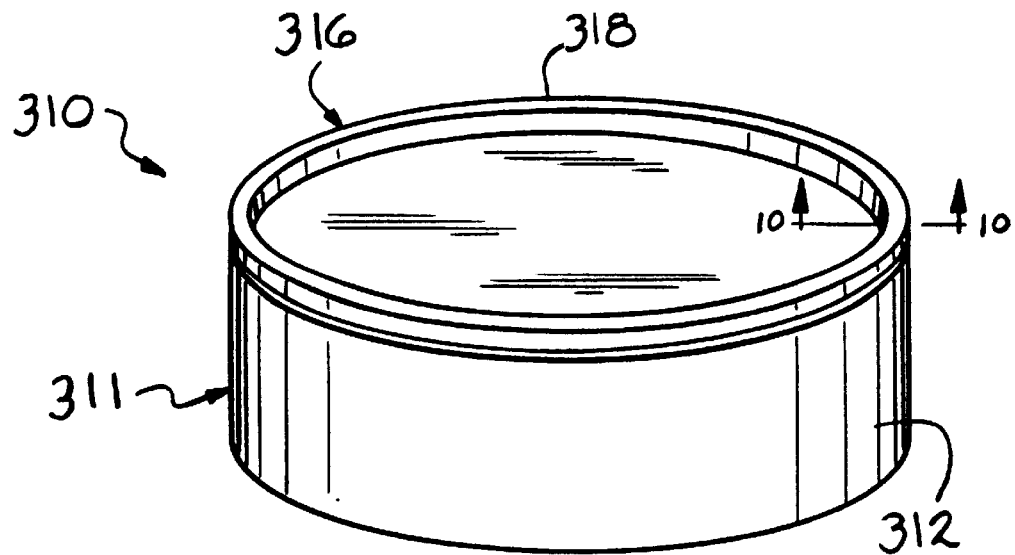
FIG. 6 is a schematic view in perspective of a container for used motor oil of the invention.
Figure 7:
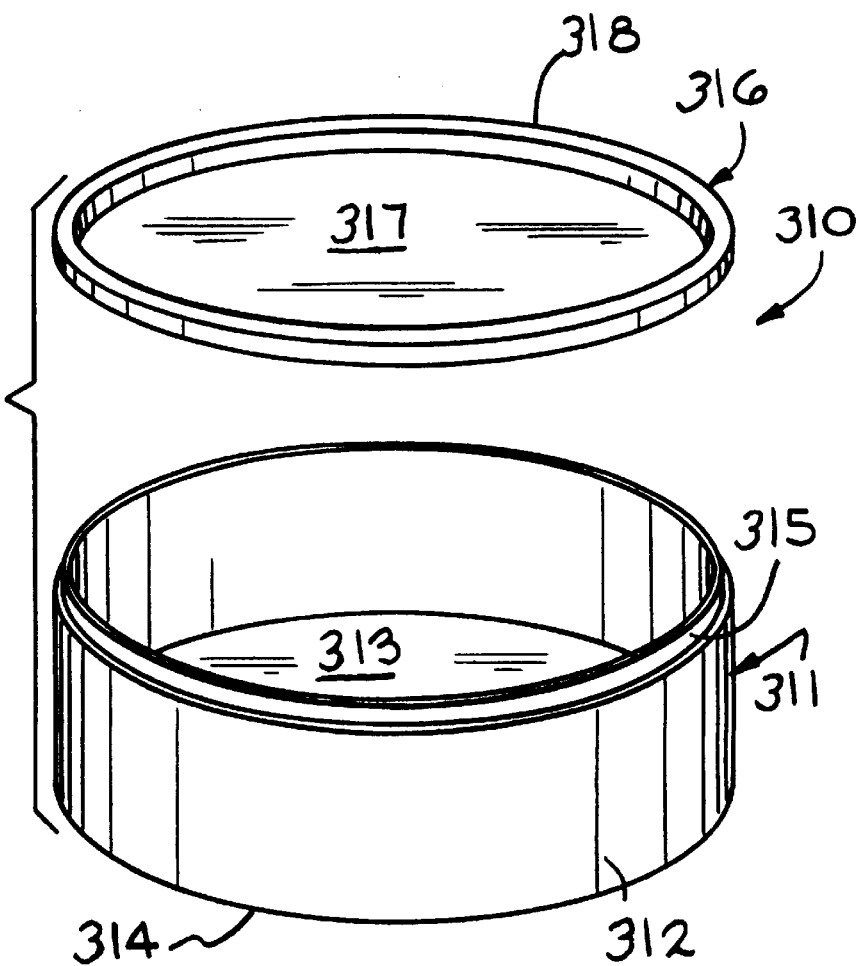
FIG. 7 is a view of the container of FIG. 6 with the lid removed from the receptacle of the container.
Figure 8:
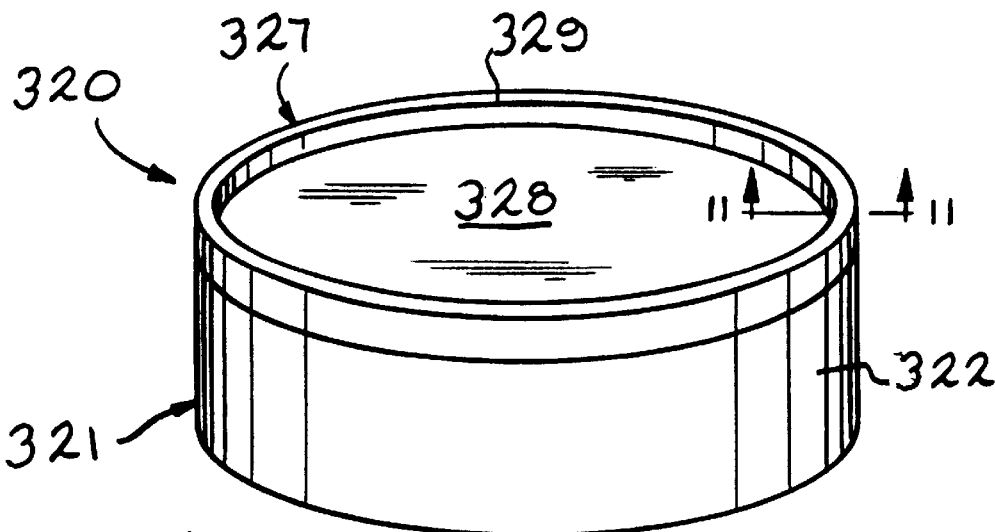
FIG. 8 is a schematic view in perspective of an alternate embodiment of a container for used motor oil of the invention.
Figure 9:
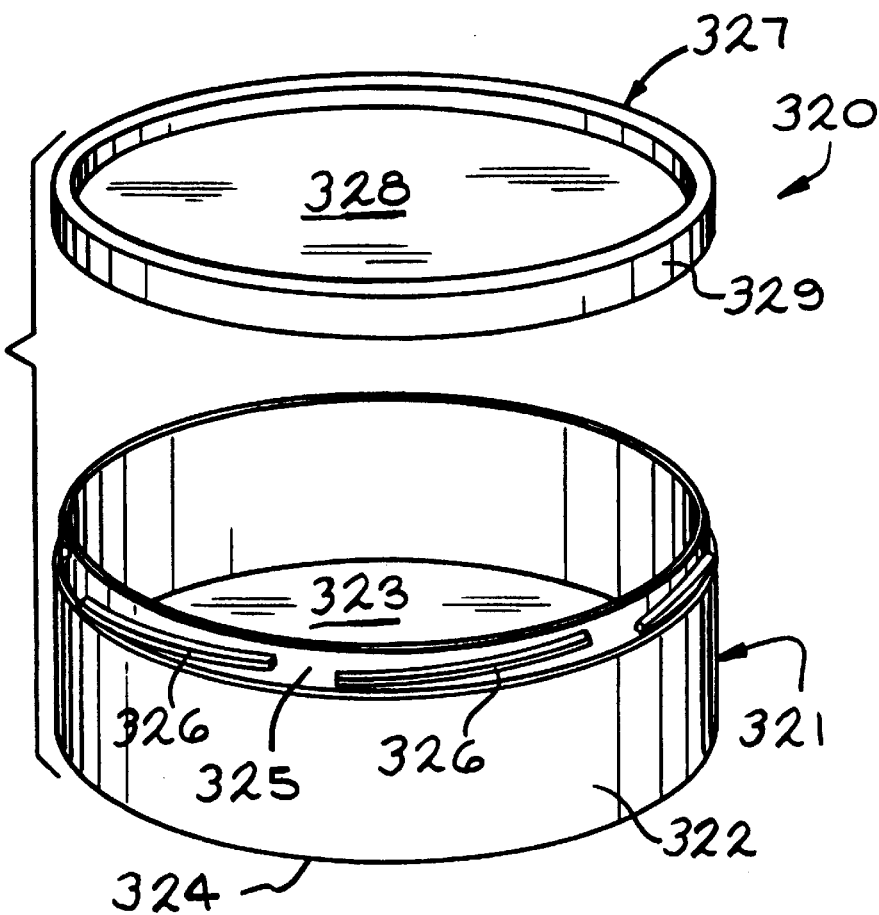
FIG. 9 is a view of the container of FIG. 8 with the lid removed from the receptacle of the container.
Figure 10:
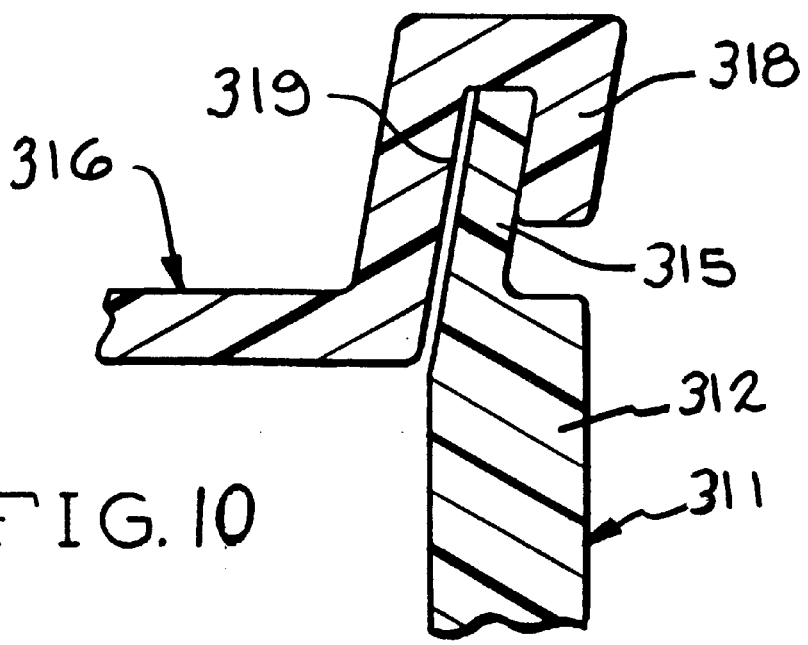
FIG. 10 is a cross-sectional view taken along line 10—10 of FIG. 6, showing the lid secured to the receptacle of the container.

FIGS. 6–14 illustrate embodiments of containers for used motor oil in accordance with the invention. In particular, FIGS. 6, 7, and 10 show a consumable container 310 for used motor oil that is generally cylindrical in shape, although any other convenient shape can be used. The container includes a receptacle 311 having a sidewall 312 and a bottom 313. The edge 314 between the sidewall and bottom is rounded to maximize the strength of the container. The receptacle has a rim 315 along the upper edge of the sidewall. As best shown in FIG. 10, the rim 315 of the receptacle angles slightly outwardly from the sidewall 312. The outside diameter of the rim is slightly smaller than the outside diameter of the remainder of the sidewall. The container also includes a lid 316 having a top 317 and a rim 318. As best shown in FIG. 10, the rim 318 of the lid angles slightly outwardly at about the same angle as the rim 315 of the receptacle. The rim of the lid has an inverted U-shaped cross-section which defines a groove 319. The groove is sized to receive the rim of the receptacle. Thus, the lid can be secured to the receptacle by pressing the lid downward so that the groove of the lid snaps onto the rim of the receptacle. In a preferred embodiment, the container has a diameter of about 30.5 cm and a height of about 7.6 cm. The sidewalls, top, and bottom all have a thickness of about 3.2 mm.

Figure 11:
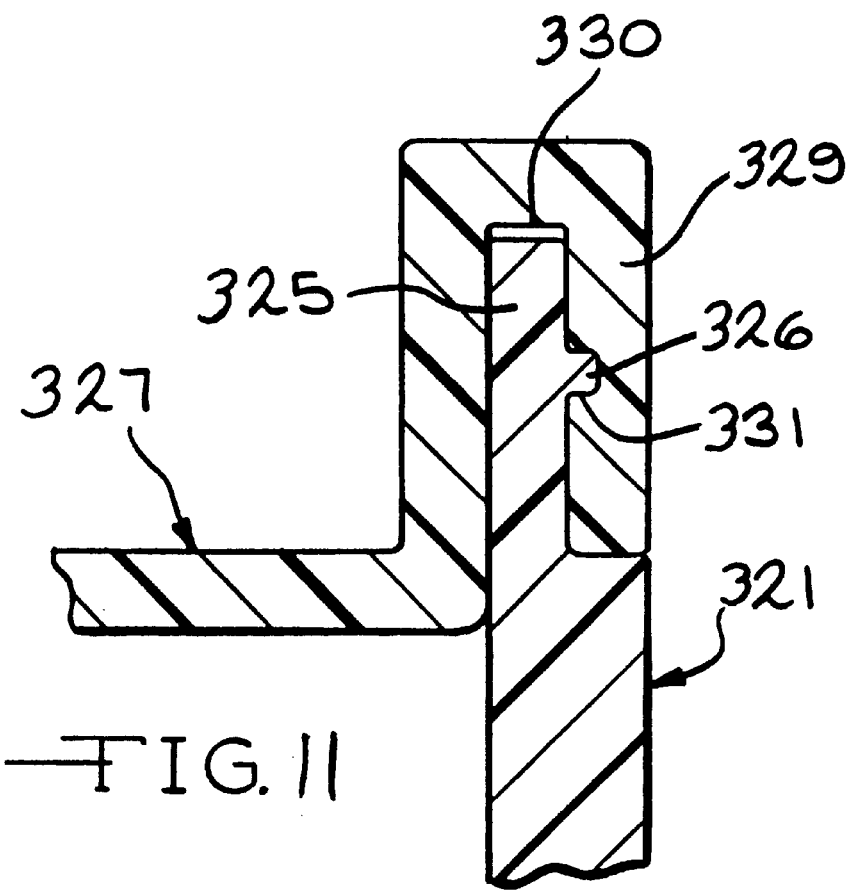
FIG. 11 is a cross-sectional view taken along line 11—11 of FIG. 8, showing the lid secured to the receptacle of the container.

An alternate embodiment of a consumable container for used motor oil is illustrated in FIGS. 8, 9, and 11. Like the above embodiment, the container 320 is generally cylindrical in shape. The container includes a receptacle 321 having a sidewall 322 and a bottom 323. The edge 324 between the sidewall and bottom is rounded. The receptacle has a rim 325 along the upper edge of the sidewall. The outside diameter of the rim is slightly smaller than the outside diameter of the remainder of the sidewall. A plurality of threads 326 is formed on the outer surface of the rim. The container also includes a lid 327 having a top 328 and a rim 329. As best shown in FIG. 11, the rim 329 of the lid has an inverted U-shaped cross-section which defines a groove 330. The groove is sized to receive the rim 325 of the receptacle. A plurality of mating threads (e.g., thread-receiving channels) 331 is formed in the outer portion of the groove, and is adapted to receive the threads 326 of the receptacle. Thus, the lid can be secured by screwing it onto the receptacle. As an alternative to the illustrated threads, continuous threading or other suitable means for securing the lid to the receptacle may be provided.

Figure 12:
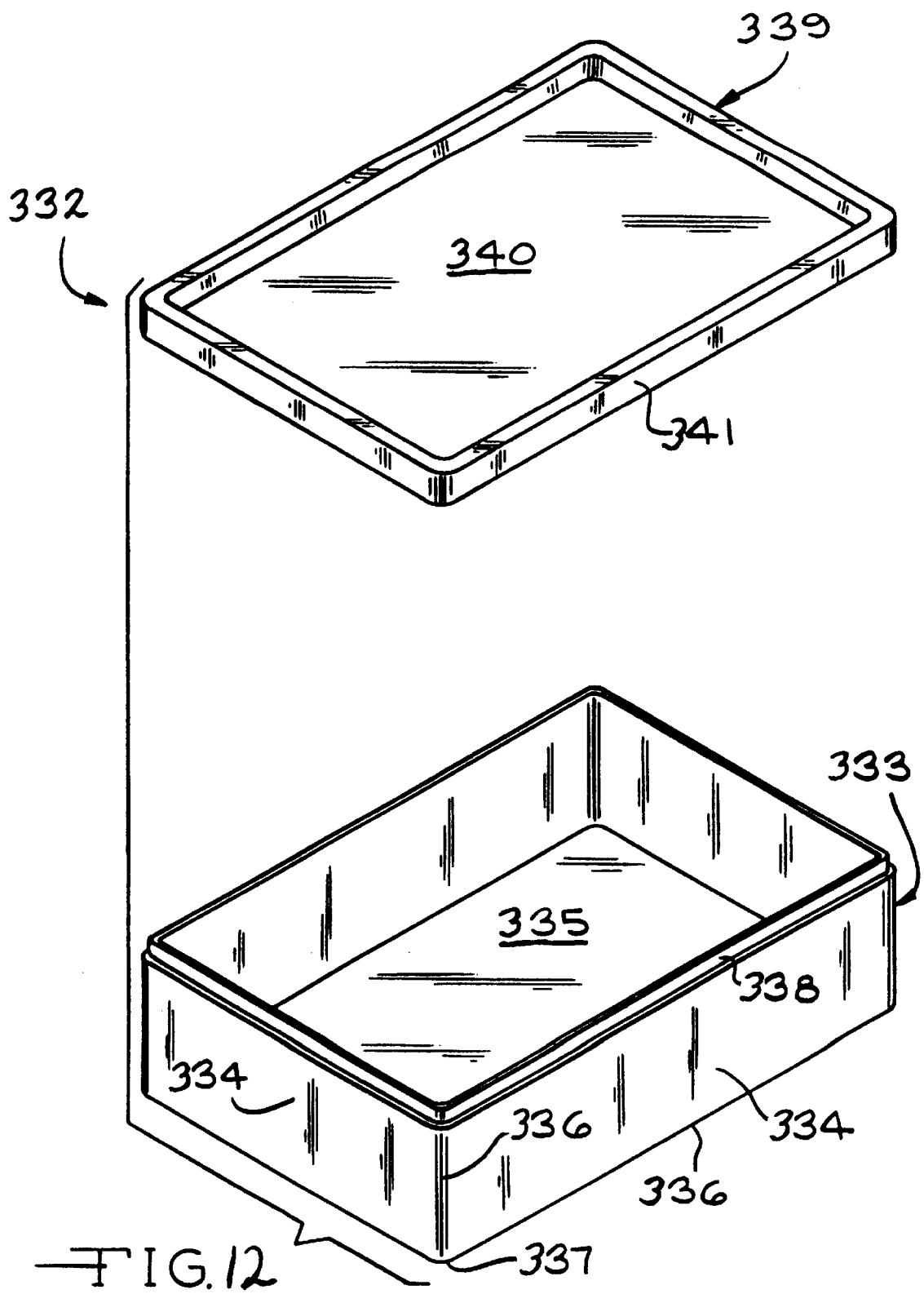
FIG. 12 is a schematic view in perspective of another alternate embodiment of a container for used motor oil of the invention, showing the lid removed from the receptacle of the container.
Figure 14:
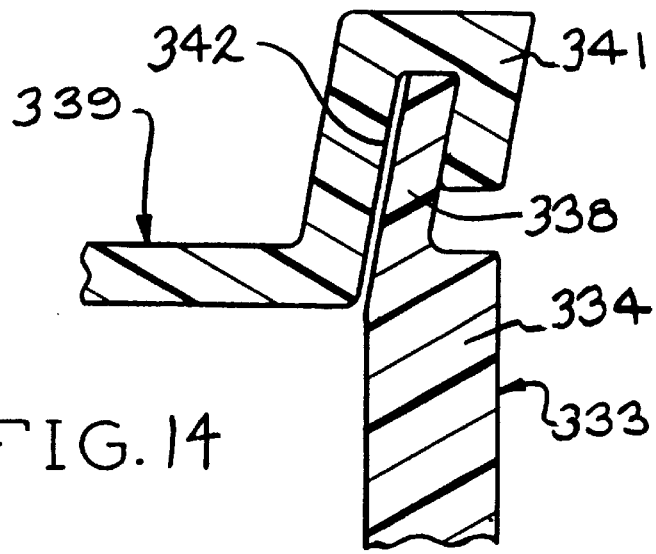
FIG. 14 is a cross-sectional view taken along line 14—14 of FIG. 13, showing the lid secured to the receptacle of the container.
Figure 13:
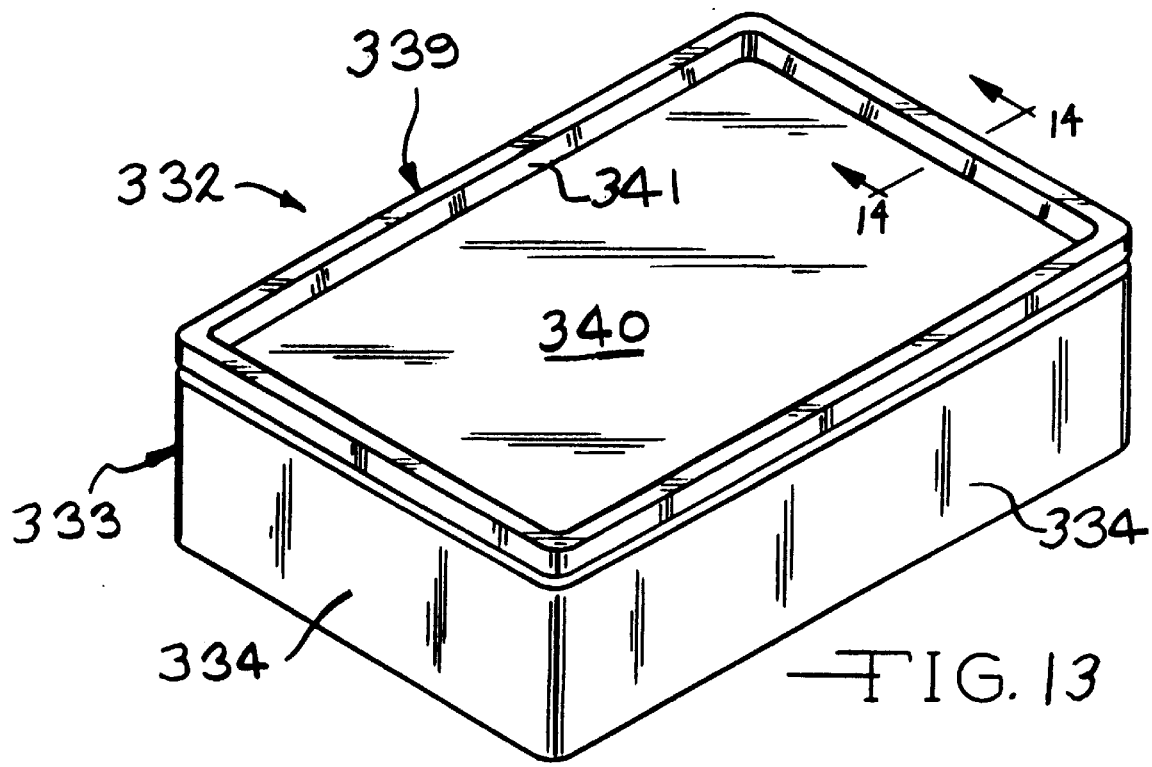
FIG. 13 is a schematic view in perspective of the container of FIG. 12.

FIGS. 12–14 illustrate another alternate embodiment of a consumable container for used motor oil in accordance with this invention. The container 332 is generally in the shape of a rectangular solid. The rectangular solid shape provides efficiencies in shipping and storing. The container includes a receptacle 333 having sidewalls 334 and a bottom 335. The edges 336 and corners 337 of the receptacle are rounded to maximize the strength of the container. The receptacle has a rim 338 along the upper edge of the sidewall. The outer surface of the rim is slightly recessed from the remainder of the sidewall. As best shown in FIG. 14, the rim 338 of the receptacle angles slightly outwardly from the sidewall 334. The container also includes a lid 339 having a top 340 and a rim 341. The rim 341 of the lid angles slightly outwardly at about the same angle as the rim 338 of the receptacle. The rim of the lid has an inverted U-shaped cross-section which defines a groove 342. The groove is sized to receive the rim of the receptacle. Thus, the lid can be secured to the receptacle by snapping it into place in the manner of a lid for a Tupperware® container. In a preferred embodiment, the container has a length of about 30.5 cm, a width of about 20.3 cm, and a height of about 7.6 cm. The sidewalls, top, and bottom have a thickness of about 3.2 mm.

Preferably the height of the container for used motor oil is from about 5 cm to about 25 cm, and more preferably from about 6 cm to about 20 cm. At this height the container will fit easily under an automobile to facilitate collection of the used motor oil. Preferably the volume of the container is from about 3 liters to about 8 liters, and more preferably from about 4.5 liters to about 6.5 liters. At this volume, the container will have sufficient capacity to hold the fluid drainage (motor oil, transmission fluid, etc.) from a standard-size engine. The container walls preferably have a thickness of from about 1 mm to about 5 mm to provide excellent strength for the container. Preferably the edges and corners of the container are rounded to maximize the strength.

The container should seal sufficiently to prevent leakage of used motor oil. The container can have a snap-on lid or a screw-on lid as described above, or other appropriate securing means such as fasteners can be used to secure the lid. In one embodiment, the lid is hinged to the receptacle of the container. For ease of recycling, preferably the means to secure the lid is part of the container, or it has substantially the same composition. As an alternative to a lid, the container can include an enclosed receptacle having an opening on top and a cap to cover the opening.

The container can be formed by any convenient process. For example, the container 310 of FIG. 6 can be formed by bonding the sidewall 312 to the bottom 313. Preferably, however, the container is formed by a molding process, such as injection molding, blow molding, or rotation molding. If desired, the molding process can be used to mold an embossment on the container for such purposes as labeling, instructions, or marketing logos.

An injection-molding process is particularly preferred. A screw and heated barrel assembly may be used to heat-soften the material to be molded. The heat softened material is then injected into a closed mold, usually by the action of the screw moving forward. The material cools and solidifies, and takes the shape of the mold cavity.

The container 310 has a composition comprising, by weight, from about 40% to about 90% asphalt and from about 10% to about 60% polymer material. Preferably the container comprises from about 55% to about 75% asphalt and from about 25% to about 45% polymer material. It is preferred to use a high proportion of asphalt in the composition of the container because of the lower cost of asphalt relative to the cost of the polymer material. Also, a higher percentage of asphalt gives rise to a greater compatibility with recyclable oil.

Exemplary asphalts used to make the container for used motor oil include any asphalt bottoms from petroleum refineries, as well as naturally occurring asphalts, tars and pitches, or these same materials that have been air-blown or otherwise chemically modified or processed. The asphalt can be a paving-grade asphalt or a roofer's-flux asphalt, as well as another type of asphalt, including a specialty asphalt such as water-proofing asphalt, a battery compound, or a sealer. Preferably the asphalt has a ring and ball softening point higher than about 90° C. A preferred asphalt is an air-blown asphalt derived from a paving-grade asphalt ranging from AC-2 to AC-50, and more preferably from AC-10 to AC-20. Another preferred asphalt is an air-blown roofer's flux.

As discussed above, the container for used motor oil is preferably formed by a molding process such as injection molding. A problem with molded containers is that they are susceptible to breakage from impacts or other rough handling. Accordingly, the container for used motor oil of this invention is preferably made from a moldable asphalt material that is formulated to provide toughness and impact resistance to withstand rough handling. The impact resistance or toughness is reflected by unnotched Izod impact strength measured according to ASTM Method D4812. The moldable asphalt material has an unnotched Izod impact of at least about 2 joules, preferably of at least about 2.7 joules, more preferably of at least about 3 joules, and even more preferably of at least about 4 joules.

In general, the polymer material to be used with the asphalt to make the container for used motor oil can be any polymer or mixture of polymers compatible with the asphalt that enables the container to have the desired physical properties. Preferably, the polymer material comprises one or more thermoplastic materials selected from high density polyethylene, low density polyethylene, polypropylene, ethylene-propylene copolymers, ethylene-vinyl acetate copolymers, and rubber. Certain polymers are preferred for their ability to provide high-temperature stability to the container, while others are preferred for their ability to impart toughness and impact resistance.

Preferred polymers include polymers selected from ethylene polymers, propylene polymers, ethylene-propylene copolymers, and butylene copolymers. In addition, copolymers of acrylates and methacrylates such as butyl, propyl, ethyl, or methyl acrylate or methacrylate can be used. Also, epoxy-functionalized copolymers are useful to improve the impact resistance and flexibility of the container, for example, a terpolymer of ethylene, butyl acrylate, and glycidyl methacrylate such as Elvaloy® AM available from E. I. duPont de Nemours & Co. A natural or synthetic rubber can also be used, such as SBS, SBR, SEBS or EPDM.

Preferably the polymer material includes an ethylene-vinyl acetate copolymer. More preferably, the ethylene-vinyl acetate copolymer has a vinyl acetate content from about 9% to about 40% by weight so that it is well soluble in recycled oil or asphalt. Ethylene-vinyl acetate copolymers with a softening point of at least about 150° C. can improve the softening resistance of the container during shipping and storage. Preferred ethylene-vinyl acetate copolymers are the "Elvax" series from duPont, such as Elvax 360 through 750, and more preferably Elvax 450 or 470. Ethylene-vinyl acetate copolymers are also available from USI Chemicals under the trade names "Ultrathene" and "Vynathene". The moldable asphalt material comprises, by weight, from about 5% to about 40% of such a polymer, preferably from about 5% to about 25%. More preferably the moldable asphalt material comprises, by weight, from about 5% to about 15% ethylene-vinyl acetate copolymer, and even more preferably from about 8% to about 12% EVA.

Polymers such as ethylene-vinyl acetate by themselves do not always provide high-temperature stability for the moldable asphalt material so that the container can withstand the high temperatures of shipping and storage as desired. Therefore, preferably the polymer material includes another polymer to increase its high-temperature stability. This polymer preferably has a melting point or glass transition temperature of at least about 150° C. Examples of such polymers include a number of thermoplastic polymers such as styrene-acrylonitrile, polybutylene terephthalate, polyurethane, and thermoplastic polyolefins. Mixtures of such polymers can also be used. A preferred polymer for enhancing high-temperature stability is polypropylene having a melting point of 163° C. and a crystallinity of 40%. The moldable asphalt material preferably comprises, by weight, from about 5% to about 55% of such a polymer, more preferably from about 20% to about 40%.

On the other hand, a polymer such as polypropylene by itself is not always sufficient to provide the moldable asphalt material with the desired toughness and impact resistance. However, when a polymer such as ethylene-vinyl acetate is mixed with it and the asphalt, the resulting moldable asphalt material has the preferred properties. In a preferred embodiment, asphalt is combined with a polymer for enhancing high-temperature stability and a polymer for imparting impact resistance such that the resulting material has an unnotched Izod impact of at least 2.7 joules, more preferably of at least about 4 joules.

Filler materials such as crushed stone, glass fibers, talc, calcium carbonate, and silica can also be used in the material for forming consumable containers for used motor oil. However, such filler materials would be undesirable in recycled oils and most recycled asphalts. It is to be understood that the ranges of materials in the compositions given herein are based on total weight in the absence of any filler materials—i.e., the filler materials are to be ignored when calculating the percentages of materials in a composition.

The container should have a sufficiently high softening point to withstand high temperatures associated with shipping and storage without softening. Preferably the material used to make a container for used motor oil has a ring and ball softening point higher than about 110° C., more preferably higher than about 125° C., and even more preferably higher than about 150° C.

While the embodiments in FIGS. 6–14 have been described in terms of a consumable container for used motor oil, it should be recognized that the container can hold other used oils or fluids. For example, the container can hold transmission fluid or hydraulic brake fluid from vehicles, or industrial oils such as hydraulic oil or grease. The container can also hold new oils or fluids and offer the advantage of easy recycling.

The invention will now be further illustrated by reference to the following examples.

EXAMPLE I

Amoco AC-10 asphalt air-blown to a softening point of 121° C., Montel Polypropylene 6301, and Elvax 450 were pelletized in a twin screw extruder at a ratio of 60:30:10 by weight. The screw temperature was set at 177° C. The pellets were used to injection-mold a consumable container as illustrated in FIG. 1. The physical properties of the material were measured. The material had an unnotched Izod impact strength of 4.5 joules, a tensile strength of 95.5 kg/cm$^2$ at 22° C. and of 25.3 kg/cm$^2$ at 93° C., and a tensile modulus of 336 kg/cm$^2$ at 93° C. Thus, it can be seen that the container was tough, impact-resistant, and strong.

After molding, the container was filled with 166° C. asphalt. The container did not significantly bulge or deform. Thermocouples on the exterior of the container never exceeded 113° C. The asphalt package, consisting of the container and the asphalt in the container, weighed 27.25 kg when full. The asphalt package constituted, by weight, about 3% container and about 97% asphalt. The container was lowered into a roofer's asphalt kettle containing molten asphalt at 246° C. Without stirring, the package was completely dissolved by natural convection within 15 minutes. The amount of smoke emitted was low.

EXAMPLE II

Consumable containers were made as described in Example I with air-blown AC 10 asphalt, polypropylene, and several different ethylene-vinyl acetate copolymers (Elvax). The copolymers had the following softening points and percentages of vinyl acetate, respectively: Elvax 360—188° C., 25%; Elvax 450—150° C., 18%; Elvax 470—223° C., 18%; and Elvax 650— 188° C., 12%. A consumable container was also made without ethylene-vinyl acetate copolymer. The materials were tested for tensile strength (in kg/cm$^2$), tensile modulus (in kg/cm$^2$), and unnotched Izod impact strength (in joules), with the comparative results shown below in Table I:

TABLE I

| Composition Asphalt: PP: EVA | EVA type: Elvax Number | Tensile Strength at 22° C. | Tensile Strength at 93° C. | Modulus at 93° C. | Unnotched IZOD Impact Strength |
|---|---|---|---|---|---|
| 60:30:10 | 360 | 117 | 25 | 451 | 5.3 |
| 60:30:10 | 450 | 96 | 25 | 336 | 4.5 |
| 60:25:15 | 450 | 72 | 17 | 276 | 2.7 |
| 60:30:10 | 470 | 110 | 30 | 450 | 7.7 |
| 60:25:15 | 650 | 98 | 18 | 448 | 10.6 |
| 60:40:0 | — | 117 | 26 | 274 | 1.8 |

It can be seen that the containers made with asphalt, polypropylene, and ethylene-vinyl acetate copolymer in accordance with this invention were tough and impact-resistant as indicated by their high unnotched Izod impact strength values. By contrast, the container made without ethylene-vinyl acetate copolymer had a lower unnotched Izod impact strength.

EXAMPLE III

A consumable container for asphalt was formed according to the following low-fuming method. Amoco AC-20 asphalt air-blown to a softening point of 121° C., polypropylene (Profax 6301), and ethylene-vinyl acetate copolymer (Elvax 450) were pelletized in a twin screw extruder at a ratio of 60:30:10 by weight. The screw temperature was set at 177° C. The pellets were used to injection-mold a consumable container as illustrated in FIG. 1. The container had a melt flow index of about 46.6 grams/10 minutes. The container was tough and impact-resistant, having an unnotched Izod impact strength of 4.5 joules, a tensile strength of 95.5 kg/cm$^2$ at 22° C., a tensile strength of 25.3 kg/cm$^2$ at 93° C., and a tensile modulus of 336 kg/cm$^2$ at 93° C.

After molding, the container was filled with a BURA Type III roofing asphalt at a temperature of 166° C. The container did not significantly bulge or deform, and thermocouples on the exterior of the container did not exceed 113° C. The asphalt package (the container and the asphalt held in the container) weighed 27.24 kg when full (0.91 kg container and 26.33 kg asphalt). The asphalt package met the requirements for Type III roofing asphalt according to ASTM D312.

The container can be melted right along with the asphalt held in the container without significantly changing the properties of the asphalt. The softening point of the asphalt alone was 89° C., and the softening point of the combined asphalt and container was 95° C. The asphalt alone had a penetration of 19 dmm at 25° C., and the combined asphalt and container had a penetration of 17 dmm at 25° C.

EXAMPLE IV(A)

Testing was conducted to compare the ability of two different asphalt products to reduce fuming from a kettle of the molten asphalt. The first product was an asphalt with added polymer according to the invention ("low-fuming product"). The second, comparative product was a standard BURA Type III roofing asphalt without added polymer ("standard product"). The standard product was a mixture of Amoco and Clark roofer's flux asphalts air-blown to a softening point of 89° C. The standard product was wrapped in a conventional paper and metal container. The low-fuming product was an asphalt package comprising the consumable container described in Example III filled with the same BURA Type III roofing asphalt.

The equipment used for the testing included a 625-liter roofer's kettle heated by liquid propane. In the testing, the low-fuming product and the standard product were separately added to the kettle and melted to fill the kettle. The products were each tested at temperatures of 232° C., 260° C., and 288° C. To simulate actual usage conditions, 75.7 liters of molten product were drained from the kettle every 20 minutes and replaced by additional product added to the kettle. The testing was conducted outdoors, with the area around the kettle being surrounded to block the wind. The fumes emitted from the kettle were measured for visual opacity, hydrocarbon emissions, and total suspended particulates as described below.

The test for visual opacity was performed in accordance with 40 CFR, Part 60, Appendix A, EPA Method 9, entitled "Visual Determination of the Opacity of Emission from Stationary Sources." A certified reader of opacity recorded the visual opacity every 15 seconds for two hours. The reader observed the fumes from the kettle and determined a percent opacity or blockage of the natural light. A low opacity indicates very little fumes, whereas a high opacity indicates a lot of fumes coming off the kettle. The results of the visual opacity readings are shown below in Table II, where the percent opacity is the average over the two-hour test:

TABLE II

| Visual Opacity | | | |
| --- | --- | --- | --- |
| Temperature of Kettle (° C.) | 232 | 260 | 288 |
| Opacity of Standard Product (%) | 45 | 70 | 80 |
| Opacity of Low-Fuming Product (%) | 20 | 10 | 20 |
| Reduction in Opacity (%) | 56 | 86 | 75 |

The results of the visual opacity readings show that the low-fuming product had visibly lower fuming from the kettle than the standard product. The standard product opacity increased as the temperature of the kettle increased. Opacity for the low-fuming product showed little increase as the temperature of the kettle increased. It was observed that the polymer of the low-fuming product formed a skim on substantially the entire upper surface of the molten asphalt.

The test for hydrocarbon emissions was performed by use of a Photovac 2020 photoionization detector (Photovac Monitoring Instruments, Deer Park, N.Y.) which was calibrated with a 100 ppm isobutylene standard. The Photovac 2020 was placed so that the sample tube was about 6.5 cm above the kettle opening. This type of testing is described in NSPS Test Method EMTIC M-21 (Feb. 9, 1983), "Determination of Volatile Organic Compound Leaks," Emission Measurement Technical Information Center. The results of the hydrocarbon emissions measurements are shown below in Table III, where the emissions are the average over the two-hour test:

TABLE III

| Hydrocarbon Emissions | | | |
| --- | --- | --- | --- |
| Temperature of Kettle (° C.) | 232 | 260 | 288 |
| Emissions of Standard Product (ppm) | 8 | 15 | 44 |
| Emissions of Low-Fuming Product (ppm) | 4 | 1 | 10 |
| Reduction in Emissions (%) | 50 | 93 | 77 |

The hydrocarbon emissions results, like the visual opacity results, show that the low-fuming product reduced the amount of fumes from the kettle compared to the standard product. The hydrocarbon emissions were consistently lower for the low-fuming product versus the standard product.

The test for total suspended particulates was performed in accordance with 40 CFR, Part 50, Appendix B, "Reference Method for the Determination of Suspended Particulate Matter in the Atmosphere (High-Volume Method)." Two high-volume (Hi-Vol) TSP (total suspended particulates) samplers were used in the testing. The samplers were elevated to position the sample inlets 33 cm above the height of the kettle rim near the kettle opening. Each of the samplers pulled a stream of fumes from the kettle through a pre-weighed filter. Each sampler was operated for two hours and the amount of particulates accumulated in the filter was measured. The results of the total suspended particulates measurements are shown below in Table IV. The measurements are given in micrograms of particulates per standard cubic feet per minute (scfm) of fumes at standard conditions of one atmosphere pressure and 20° C.

TABLE IV

| Total Suspended Particulates | | | |
| --- | --- | --- | --- |
| Sampler 1: | | | |
| Temperature of Kettle (° C.) | 232 | 260 | 288 |
| Particulates of Standard Product ($\mu$g/scfm) | 92 | 346 | 658 |
| Particulates of Low-Fuming Product ($\mu$g/scfm) | 57 | 46 | 65 |
| Reduction in Particulates (%) | 38 | 87 | 90 |
| Sampler 2: | | | |
| Temperature of Kettle (° C.) | 232 | 260 | 288 |
| Particulates of Standard Product ($\mu$g/scfm) | 70 | 266 | 378 |
| Particulates of Low-Fuming Product ($\mu$g/scfm) | 45 | 48 | 79 |
| Reduction in Particulates (%) | 36 | 82 | 79 |

These results, like the visual opacity and hydrocarbon emissions results, show that the low-fuming product reduced the amount of fumes from the kettle compared to the standard product. The particulates were consistently lower for the low-fuming product versus the standard product.

EXAMPLE IV(B)

Similar comparative testing was conducted as described in Example IV(A) at another outdoor site on a low-fuming product and standard product. The following results were obtained at 260° C.:

TABLE V

Visual Opacity and Hydrocarbon Emissions

| | | | |
|---|---|---|---|
| Opacity of Standard Product (ppm) | 38.6 | Emissions of Standard Product (ppm) | 21.8 |
| Opacity of Low-Fuming Product (ppm) | 0.8 | Emissions of Low-Fuming Product (ppm) | 1.3 |
| Reduction in Opacity (%) | 98 | Reduction in Emissions (%) | 94 |

EXAMPLE V

Montel Polypropylene 6301 and coating asphalt having a softening point of 230° F. (110° C.) were pelletized in a twin screw extruder at a ratio of 30:70 by weight. The screw temperature was set at 350° F. (177° C.). The pellets were used to injection-mold containers in the shape of a tray with dimensions of 10 inches×13 inches×3.5 inches (25.4 cm×33.0 cm×8.9 cm), and a thickness of 100 mil. One of the containers was filled with asphalt at 350° F. (177° C.). The container bulged, but did not melt or spill out the molten asphalt. Several containers were added to a kettle and soon melted without a visible trace.

EXAMPLE VI

Several of the molded asphalt containers of Example V were added to a body of molten BURA Type III asphalt. The weight of the containers was 4 percent of the total weight of the asphalt and containers. The properties of the asphalt before and after addition of the containers were measured, with the results given in the table below along with the ASTM D312 Type III specifications for comparison.

TABLE VI

| Property | BURA Type III Asphalt Alone | Asphalt + 4 wt. % Container | ASTM D312 Type III spec. |
|---|---|---|---|
| Softening pt | 192° F. (89° C.) | 204° F. (96° C.) | 185–205° F. (85–96° C.) |
| Penetration @ 77° F., 100 g | 19 dmm | 16 dmm | 15–35 dmm |
| Penetration @ 115° F., 50 g | 37 dmm | 29 dmm | 90 dmm max. |
| Viscosity @ 400° F. | 140 cps | 254 cps | — |
| Viscosity @ 425° F. | 91 cps | 150 cps | — |
| Viscosity @ 450° F. | 64 cps | 95 cps | — |

It can be seen that the addition of the container to the asphalt had only a slight effect on the properties of the asphalt, with the most pronounced change being the increased viscosity.

EXAMPLE VII

Montel Polypropylene 6301, a highly blown asphalt, and BURA Type III asphalt were pelletized in a twin screw extruder at a ratio of 40:20:40 by weight. The highly blown asphalt was a Trumbull material from a propane-washed asphalt blend having been blown to a softening point of 300° F. (149° C.). The screw temperature was set at 350° F. (177° C.). The pellets were used to injection-mold a container that was 8 inches in diameter and 7.5 inches high, and 90 mil thick. After molding, the container was filled with 350° F. (149° C.) asphalt. The container did not bulge or deform. Temperature readings on thermocouples placed on the exterior never exceeded 160° F. (71° C.). The asphalt package of the container and the asphalt therein weighed 10 lbs. when full. The container was lowered in a wire basket into a roofer's asphalt kettle containing molten asphalt at 475° F. (246° C.). Without stirring, the package was completely dissolved by natural convection without any visible trace within 15 minutes. The properties of the asphalt before and after addition of the containers were measured, with the results given in the table below in comparison with the ASTM D312 Type III specifications.

TABLE VII

| Property | BURA Type III Asphalt Alone | Asphalt + 4 wt. % Container | ASTM D312 Type III spec. |
|---|---|---|---|
| Softening pt | 192° F. (89° C.) | 207° F. (97° C.) | 185–205° F. (85–96° C.) |
| Penetration @ 77° F., 100 g | 19 dmm | 17 dmm | 15–35 dmm |
| Penetration @ 115° F., 50 g | 37 dmm | 29 dmm | 90 dmm max. |
| Viscosity @ 400° F. | 140 cps | 254 cps | — |
| Viscosity @ 425° F. | 91 cps | 150 cps | — |
| Viscosity @ 450° F. | 64 cps | 95 cps | — |

The results are similar to those in Example VI. The softening point of the asphalt having the melted container was slightly above the Type III specification.

EXAMPLE VIII

The asphalt formula of Example VII (40:20:40 Montel PP:highly blown asphalt:Type III asphalt) were used to injection-mold a number of 5-gallon, generally cylindrical buckets. The buckets were 15 inches (38.1 cm) high, with a top diameter of 12 inches (30.5 cm) and a bottom diameter of 10 inches (25.4 cm). Five of the buckets were arranged together, and Type III asphalt at 350° F. (177° C.) was poured into the buckets using production equipment. The buckets were closely spaced to replicate actual asphalt pouring conditions, and the ambient temperature was about 87° F. (31° C.). The containers withstood the hot asphalt and showed no signs of deformation.

EXAMPLE IX

A consumable container for used motor oil in accordance with this invention is made as follows. Amoco AC-10 asphalt air-blown to a softening point of 121° C., Montel® Polypropylene 6301, and Elvax® 450 are pelletized in a twin screw extruder at a ratio of 60:30:10 by weight. The screw temperature is set at 177° C. The pellets are used to injection mold the container for used motor oil shown in FIG. 6 or 7. The material has an unnotched Izod impact of about 4.5 joules; thus, the container is tough and impact resistant. In contrast, a container made with 60% asphalt and 40% polypropylene, but without ethylene-vinyl acetate copolymer, has a lower unnotched Izod impact of about 1.8 joules, and is not as tough and impact resistant. After molding, the container is filled with used motor oil. The container is shipped for recycling and added into an oil recycling stream where it dissolves.

The above examples and embodiments are given to illustrate preferred features and aspects of the invention. Various modifications and alternative embodiments will become apparent to those skilled in the art through routine practice of the invention. For example, the moldable asphalt material can also be used to mold or otherwise form other products, such as small buckets, flower pots, stands, and moldable machine parts. The size, shape, and thickness of each product can be appropriately selected for the desired application or end use. Moreover, in place of or in addition to a polymer, another suitable additive or modifier may be used in the container of an asphalt package to impart the desired properties to the asphalt in a kettle. Furthermore, the consumable container may be used to hold or package a variety of materials—for instance, the container may be used to package new motor oil, which may be used to contain recyclable motor oil after the new motor oil has been emptied from the container, or to package or hold new or recyclable frying grease or oil. Thus, the invention is intended not to be limited by the foregoing description, but to be defined by the appended claims and their equivalents.

What is claimed is:

1. In a method of melting asphalt in which an amount of unmelted asphalt is placed into a kettle and heated to melt the asphalt, the molten asphalt normally emitting fumes from the kettle, the improvement comprising: adding about 0.25 weight percent to about 6 weight percent of a polymer material to the asphalt to reduce the visual opacity of the fumes by at least about 25% of the visual opacity of the asphalt without the polymer material.

2. The method of claim 1, wherein the added polymer material forms a skim on the upper surface of the molten asphalt.

3. The method of claim 2, wherein the polymer material has a melt flow index of from about 15 grams/10 minutes to about 95 grams/10 minutes.

4. The method of claim 1, wherein both the asphalt without the polymer material and the asphalt with the added polymer material meet the requirements for at least one type of roofing asphalt according to ASTM D312.

5. The method of claim 4, wherein the addition of the polymer material to the molten asphalt neither changes the softening point of the asphalt by more than about 9° C. nor changes the penetration of the asphalt by more than about 10 dmm at 25° C.

6. The method of claim 5, wherein from about 0.5 percent to about 3 percent of the polymer material, based on the total weight of the asphalt and polymer material, is added.

7. The method of claim 1, wherein from about 0.5 percent to about 3 percent of the polymer material, based on the total weight of the asphalt and polymer material, is added.

8. The method of claim 1, wherein the polymer material is selected from the group consisting of polypropylene, ethylene-vinyl acetate copolymer having a vinyl acetate content of from about 5 weight percent to about 40 weight percent, rubber, and mixtures thereof.

9. The method of claim 1, wherein the visual opacity of the fumes is reduced by at least about 35% at 260° C.

10. In a method of providing molten asphalt in which an amount of unmelted asphalt is placed into a kettle and heated to melt the asphalt, the molten asphalt normally emitting fumes from the kettle, the improvement comprising: adding from about 0.25 weight percent to about 6 weight percent of a polymer material to the asphalt to reduce the hydrocarbon emissions of the fumes by at least about 20% of the hydrocarbon emissions of the asphalt without the polymer material.

11. The method of claim 10, wherein the added polymer material forms a skim on the upper surface of the molten asphalt.

12. The method of claim 11, wherein the polymer material has a melt flow index of from about 15 grams/10 minutes to about 95 grams/10 minutes.

13. The method of claim 10, wherein the polymer is an ingredient of a consumable container holding the amount of unmelted asphalt, the container made from a material comprising from about 40 weight percent to about 90 weight percent of an asphalt and from about 10 weight percent to about 60 weight percent of the polymer material.

14. The method of claim 10, wherein the hydrocarbon emissions of the fumes are reduced by at least about 30% at 260° C.

15. A method of providing molten asphalt in which asphalt is placed in a kettle and heated to melt the asphalt, the molten asphalt normally emitting fumes from the kettle, the improvement comprising: adding from about 0.25 weight percent to about 6 weight percent of a polymer material to the asphalt to reduce the total suspended particulates emissions of the fumes by at least about 15% of the total suspended particulates emissions of the asphalt without the polymer material.

16. The method of claim 15, wherein the added polymer material forms a skim on the upper surface of the molten asphalt.

17. The method of claim 16, wherein the polymer material has a melt flow index of from about 5 grams/10 minutes to about 110 grams/10 minutes.

18. The method of claim 15, wherein the polymer material is added in the form of a consumable container containing the amount of unmelted asphalt, the container made from a material comprising from about 40 weight percent to about 90 weight percent of an asphalt and from about 10 weight percent to about 60 weight percent of the polymer material.

19. The method of claim 18, wherein the total emissions of suspended particulates of the fumes is reduced by at least about 25% at 260° C., and the container material has an unnotched Izod impact strength of at least about 2 joules.

20. In a method of melting asphalt in which an amount of unmelted asphalt is placed into a kettle and heated to melt the asphalt, the molten asphalt normally emitting fumes from the kettle, the improvement comprising:

adding about 0.25 weight percent to about 6 weight percent of a polymer material to the asphalt, said polymer material being an ingredient of a consumable container comprising a polymer material and asphalt;

wherein, during the melting of the asphalt the polymer material, the amount of the polymer material is sufficient to reduce the visual opacity of the fumes by at least about 25% of the visual opacity of the melted asphalt in the absence of the polymer material.

21. The method of claim 20, wherein the consumable container comprises from about 40 weight percent to about 90 weight percent of an asphalt, and from about 10 weight percent to about 60 weight percent of the polymer material.

22. The method of claim 20, wherein the amount of the polymer material is sufficient to reduce the hydrocarbon emissions of the fumes by at least about 20% of the hydrocarbon emissions from the melted asphalt in the absence of the polymer material.

23. The method of claim 20, wherein the amount of the polymer material is sufficient to reduce the total suspended particulates emissions of the fumes by at least about 15% of the total suspended particulates emissions from the melted asphalt in the absence of the polymer material.

* * * * *